United States Patent [19]
Ellis

[11] Patent Number: 5,986,011
[45] Date of Patent: *Nov. 16, 1999

[54] BULK RADICAL POLYMERIZATION USING A BATCH REACTOR

[75] Inventor: Mark F. Ellis, Maplewood, Minn.

[73] Assignee: Minnesota Mining and Manufacturing Company, St. Paul, Minn.

[*] Notice: This patent is subject to a terminal disclaimer.

[21] Appl. No.: 08/870,724

[22] Filed: Jun. 6, 1997

Related U.S. Application Data

[63] Continuation of application No. 08/572,310, Dec. 14, 1995, Pat. No. 5,637,646.

[51] Int. Cl.[6] .......................................... C08F 2/02
[52] U.S. Cl. ................ 525/309; 526/88; 526/307.7; 526/328.5; 526/285
[58] Field of Search .................. 525/309; 526/88, 526/307.7, 328.5, 285

[56] References Cited

U.S. PATENT DOCUMENTS

| | | |
|---|---|---|
| 2,769,804 | 11/1956 | Hanson . |
| 3,234,303 | 2/1966 | Bild et al. . |
| 3,786,116 | 1/1974 | Milkovich et al. . |
| 3,821,330 | 6/1974 | Free . |
| 3,842,059 | 10/1974 | Milkovich et al. . |
| 4,130,700 | 12/1978 | Kamath ..................... 526/73 |
| 4,181,752 | 1/1980 | Martens et al. ........... 427/54.1 |
| 4,220,744 | 9/1980 | Tulacs et al. ............. 526/86 |
| 4,275,177 | 6/1981 | Walkenhorst et al. .... 525/53 |
| 4,282,334 | 8/1981 | Walter et al. ............. 525/53 |
| 4,404,338 | 9/1983 | De Toffol et al. ........ 526/86 |
| 4,530,979 | 7/1985 | Birch ........................ 526/64 |
| 4,619,979 | 10/1986 | Kotnour et al. ........... 526/88 |
| 4,732,808 | 3/1988 | Krampe et al. ........... 428/355 |
| 4,737,559 | 4/1988 | Kellen et al. ............. 526/291 |
| 4,843,134 | 6/1989 | Kotnour et al. ........... 526/318.4 |
| 4,983,668 | 1/1991 | Cutter et al. .............. 525/23 |
| 5,244,926 | 9/1993 | Harris et al. .............. 521/148 |
| 5,252,662 | 10/1993 | Su et al. ................... 524/549 |
| 5,300,601 | 4/1994 | Besecke et al. .......... 526/228 |
| 5,407,971 | 4/1995 | Everaerts et al. ........ 522/35 |
| 5,637,646 | 6/1997 | Ellis ......................... 525/309 |
| 5,653,968 | 8/1997 | Carballada et al. ...... 424/70.11 |
| 5,753,768 | 5/1998 | Ellis ......................... 525/309 |

FOREIGN PATENT DOCUMENTS

| | | |
|---|---|---|
| 42 35 785 A1 | 5/1994 | Germany . |
| 42 35 789 A1 | 5/1994 | Germany . |
| 58-87171 | 5/1983 | Japan . |
| 56-185709 | 1/1990 | Japan . |
| 6-239905 | 8/1994 | Japan . |
| 2 284 425 | 6/1995 | United Kingdom . |

OTHER PUBLICATIONS

G. Odian, Principles of Polymerization, Third Edition, A Wiley–Interscience Publication, pp. 301–302, 1991.

W.H. Ray, "On the Mathematical Modeling of Polymerization Reactors" in J. Macromol. Sci.–Revs. Macromol. Chem., C8(1), pp. 1–56, 1972.

M.E. Sacks et al., "Effect of Temperature Variations on Molecular Weight Distributions: Batch, Chain Addition Polymerizations" in Chem. Eng. Sci., vol. 28, p. 241–257, 1973.

D.N. Schulz, "Functionally Terminal Polymers via Anionic Methods" paper presented at Houston meeting, vol. 21, No. 1, pp. 32–33, American Chemical Society, Mar. 1980.

J.A. Biesenberger et al., "A Study of Chain Addition Polymerizations Properties"in Polymer Engineering and Science, Nov. 1975, vol. 14, No. 11.

J.A. Biesenberger et al., "A Study of Chain Addition Polymerizations with Temperature Variations: II. Thermal Runaway and Instability–A Computer Study" in Polymer Engineering and Science , Feb. 1976, vol. 16, No. 2.

D.H. Sebastian et al., "A Study of Chain Addition Polymerizations with Temperature Variations: III. Thermal Runaway and Instability in Styrene Polymerization–An Experimental Study" in Polymer Engineering and Science, Feb. 1976, vol. 16, No. 2.

D.H. Sebastian et al., "A Study of Chain Addition Polymerizations with Temperature Variations: IV. Copolymerizations—Experiments with Styrene–Acrylonitrile" in Polymer Engineering and Science, Feb. 1979, vol. 19, No. 3.

J.A. Biesenberger et al., "Thermal Ignition Phenomena in Chain Addition Polymerizations" in Applied Polymer Symposium, No. 26, pp. 211–236, John Wiley & Sons, 1975.

D.N. Schulz et al., "Functionally Terminal Polymers via Anionic Methods" (Chapter 27) in Anionic Polymerization: Kinetics, Mechanisms, and Synthesis (James E. McGrath, Editor), ACS Symposium Series 166, American Chemical Society, Washington, D.C. 1981.

*Primary Examiner*—Jeffrey C. Mullis
*Attorney, Agent, or Firm*—Daniel C. Schulte

[57] ABSTRACT

The present invention provides a method for the polymerization of free-radically polymerizable vinyl monomers in a batch reactor under essential adiabatic conditions.

27 Claims, 3 Drawing Sheets

BULK RADICAL POLYMERIZATION USING A BATCH REACTOR

This is a continuation of application Ser. No. 08/572,310 filed Dec. 14, 1995. now U.S. Pat. No. 5,637,646.

FIELD OF THE INVENTION

The present invention provides a method for the polymerization of free-radically polymerizable vinyl monomers in a batch reactor.

BACKGROUND OF THE INVENTION

Bulk (i.e. mass) free-radical polymerization of pure monomer typically involves high heat of reaction (i.e. highly exothermic), increasing solution viscosity as polymerization progresses and the corresponding decrease in heat transfer coefficient of the reacting material. Because of these problems, controlling the temperature of bulk polymerization processes can be extremely difficult. However, it is well known to those skilled in the art that maintaining the desired temperature, is very important because of the strong dependence of the free-radical reaction kinetics on the reaction temperature, directly affecting the polymer properties such as molecular weight distribution and molecular weight. If the heat released from reaction exceeds the heat removal capability due to decreasing heat transfer, uncontrolled runaway can result where the rate of reaction increases as the temperature escalates due to exothermic reaction.

To circumvent these problems, free-radical solution polymerization is commonly performed where a non-reactive solvent in which the monomer and polymer are both soluble is used to reduce the heat load as well as to increase the heat transfer coefficient of the reacting mixture to facilitate temperature control. Alternatively, the heat load and viscosity/heat transfer problems are commonly managed by suspension polymerization and emulsion polymerization approaches. Solution polymerization, suspension polymerization, and emulsion polymerization approaches are disadvantageous in that they require extra equipment arid extra processing. Solution, suspension, and emulsion polymerization provide a decreased yield over bulk polymerization for a specific reactor volume. Emulsion and suspension polymerization offer the possibility of contaminants being introduced into the polymer from the surfactants and/or emulsifiers used in the polymerization process. Contaminants can also be introduced through impurities in the solvent in solution polymerization. Further, in the case of solution polymerization, solvent handling can be dangerous because of the threat of fire and/or explosion. Solvent handling can be expensive because extra equipment may be necessary to capture the solvent for reuse or other capture method, such as thermal oxidizers, may be required to prevent the compounds from being vented to the atmosphere.

Bulk free-radical polymerization heat transfer difficulties can be often managed in continuous processes. For example, reactive extrusion has been disclosed (U.S. Pat. Nos. 4,619,979; 4,843,134; and 3,234,303) as a useful bulk polymerization process because of the high heat transfer capability due to the large heat transfer area per unit reacting volume and the extremely high miring capability. Similarly, a continuous static mixer reactor with high heat transfer area for temperature controlled bulk free radical polymerization has been disclosed in U.S. Pat. No. 4,275,177.

As a rule, runaway free-radical polymerization reactions are not practiced because of their potentially disastrous consequences (*Principles of Polymerization*, Odian, G., 3rd Edition, Wiley-Interscience, p. 301, 1991). Generally, methods are used to control batch bulk polymerization reaction temperature to prevent runaway (i.e., U.S. Pat. Nos. 4,220,744, 5,252,662, JP 56185709).

Biesenberger et al. investigate batch runaway polymerization ("A Study of Chain Addition Polymerizations with Temperature Variations: I. Thermal Drift and Its Effect on Polymer Properties," J. A. Biesenberger and R. Capinpin, *Polymer Engineering and Science*, November, 1974, Vol. 14, No. 11, "A Study of Chain Addition Polymerizations with Temperature Variations: II. Thermal Runaway and Instability—A Computer Study," J. A. Biesenberger, R. Capinpin, and J. C. Yang, *Polymer Engineering and Science*, February, 1976, Vol. 16, No. 2, "A Study of Chain Addition Polymerizations with Temperature Variations: III Thermal Runaway and Instability in Styrene Polymerization—An Experimental Study," D. H. Sebastian and J. A. Biesenberger, *Polymer Engineering and Science*, February, 1976, Vol. 16, No. 2, "A Study of Chain-Addition Polymerizations with Temperature Variations. IV. Copolymerizations—Experiments with Styrene-Acrylonitrile," D. H. Sebastian and J. A Biesenberger, *Polymer Engineering and Science*, February, 1979, Vol. 19, No. 3, "Thermal Ignition Phenomena in Chain Addition Polymerizations," J. A. Biesenberger, R. Capinpin, and D. Sebastian, *Applied Polymer Symposium*, No. 26, 211–236, John Wiley & Sons, 1975). In Part II of the Biesenberger et al series, potential benefits of runaway polymerization are suggested. However, the purpose of the series is to understand runaway polymerization in order to prevent it. The series does not teach practical aspects of useful runaway polymerization in an industrial setting, as disclosed in the present invention. Adiabatic conditions are not employed in the Biesenberger et al. runaway polymerizations.

Continuous free-radical polymerization processes have been disclosed which involve adiabatic polymerization in tubular reactors (U.S. Pat. No. 3,821,330, DE 4235785A1). These approaches use equipment more complicated than a batch reactor.

Although industrially important, batch (non-continuous) reactors are less frequently used for bulk free-radical polymerization. The prime difficulty with batch reactors is that the heat transfer area per unit reacting volume is poor and becomes increasingly poor with larger reactor size. Methods of free-radical polymerization for acrylate pressure sensitive adhesive (PSA) production in batch reactors have been disclosed where polymerization chemistry is adjusted to slow the reaction rate so that the reaction temperature can be controlled (U.S. Pat. No. 5,252,662, JP 56185709). The difficulty with these approaches is that the heat transfer area of the batch reactor is still being relied upon to control reaction temperature by removing the heat of reaction and prevent runaway. Therefore, these polymerization approaches will not scale up directly because of the varying heat transfer capability with batch reactor size and they will be difficult to perform in large batch reaction equipment because of the increasingly poor heat transfer per unit volume with reactor size. Further, in controlling the heat load by slowing the reaction rate, the cycle time and thus productivity of a reaction vessel is decreased.

Batch reactors are desirable over continuous reactors in certain instances. For example, a specialty chemical manufacturer tends to produce multiple products. In this case batch reactors can be beneficial because of their multipurpose nature (i.e. not necessarily designed for a particular product or chemistry as is often the case with continuous equipment). In addition, often the economics of a batch reactor are favorable over that for a continuous process because of the relative simplicity of a batch reactor equipment. Typically, continuous processes become economical for high-volume commodity products (i.e. polystyrene).

In addition, the use of batch reactors for adhesive production is common because of the economics of their typical production volumes. Common monomers that are a major contributor to the composition of pressure sensitive adhesives (see below) have relatively high boiling points, and because of their relatively high molecular weights, have relatively low heat of reaction per unit mass. Therefore, the adiabatic temperature rise is such that the resulting mixture vapor pressure during reaction remains below about 100–300 psig (792.9–2171.8 kPa), pressures handled by common batch reactor equipment.

Advantages of bulk polymerization to produce hot-melt adhesives over other conventional polymerization methods are described in U.S. Pat. No. 4,619,979.

SUMMARY OF THE INVENTION

The present invention provides a novel method for producing polymer by bulk free-radical polymerization in a batch reactor. The term "polymerizaticlnl" as used herein with respect to the present invention includes also telomerizatiori. Rather than the conventional approach of directly controlling the reaction temperature, the present invention makes use of appropriately chosen free-radical initiator(s) and reacting in essentially adiabatic runaway reaction cycles.

As described herein, a "reaction cycle" is defined as a processing sequence where initiator(s), monomers (which are not optional in the first reaction cycle, but which may be optional in subsequent reaction cycle), and optional component(s) are added to the batch followed by one or more essentially adiabatic reactions with optional heating between the essentially adiabatic reactions.

As defined herein, by "essentially adiabatic" it is meant that total of the absolute value of any energy exchanged to or from the batch during the course of reaction will be less than about 15% of the total energy liberated due to reaction for the corresponding amount of polymerization that has occurred during the time that polymerization has occurred. Expressed mathematically, the essentially adiabatic criterion is:

$$\int_{t_1}^{t_2} \sum_{j=1}^{N} |q_j(t)| dt \leq f \cdot \int_{x_1}^{x_2} \Delta H_p(x) dx \quad (1)$$

where $f$ is about 0.15, $\Delta H_p$ is the heat of polymerization, x=monomer conversion=$(M_o-M)/M_o$ where M is the concentration of the monomer and $M_o$ is the initial monomer concentration, $x_1$ is the polymer fraction at the start of the reaction and $x_2$ is the polymer fraction due to polymerization at the end of the reaction, t is the time. $t_1$ is the time at the start of reaction, $t_2$ is the time at the end of reaction, and $q_j(t)$, wherein j=1 . . . N is the rate of energy transferred to the reacting system from the surroundings from all N sources of energy flow into the system. Examples of energy transfer sources for $q_j(t)$, wherein j=1 . . . N include, but are not limited to, heat energy conducted to or from the batch from the reactor jacket, energy required to warm internal components in the reaction equipment such as the agitator blades and shaft, and work energy introduced from mixing the reacting mixture. In the practice of the present invention, having $f$ as close to zero as possible is preferred to maintain uniform conditions within a batch during a reaction (i.e., maintain homogeneous temperature conditions throughout a batch) which helps to minimize batch-to-batch variations in a particular piece of equipment as well as minimize batch-to-batch variations when reactions are made in batch reactors of differing sizes (i.e., uniform scaleup or scale down of reaction).

Although one essentially adiabatic reaction may be employed, generally two or more essentially adiabatic reaction cycles are employed if essentially complete conversion of monomer to polymer is desired. There typically is cooling between the reaction cycles. Cooling of the reaction mixture between reaction cycles typically is performed to prevent the temperature of the reaction mixture from increasing to a point where the product is unstable. This instability can be manifest by polymer discoloration, polymer oxidation, depolymerization to produce undesirable low molecular weight oligomers, etc. The temperature necessary to avoid instability depends in part on the monomers being used. To avoid such instability the temperature of the reaction mixture is generally kept below about 300° C., preferably below about 250° C. The reaction conditions are also typically chosen so that at the end of the final reaction cycle, the product viscosity is such that draining from the reaction vessel can be performed (Brookfield viscosity at draining temperature less than about 500,000 centipoise).

Optionally, a series of one or more essentially adiabatic reaction cycles can be used to provide a syrup of polymer dissolved in monomer, typically in the range of about 40–95 weight % based on total weight of monomer(s) and polymer where the unreacted monomer can be optionally stripped from the polymer to provide the final polymer product rather than running the reaction to completion.

The method of the present invention uses one or more thermal free radical initiators that under the increasing reaction temperature profile from essentially adiabatic reaction conditions, provide free radicals at a rate such that narrow polymer molecular weight distribution is obtained. The amount of free radicals generated during the increasing temperature profile is controlled by the amounts of each initiator used and the temperature decomposition characteristics of the selected initiators. Experience has shown that this inventive process is capable of achieving polymer molecular weight distributions essentially the same as or narrower than isothermal solution polymerization methods.

As disclosed herein, when appropriately polymerized, essentially adiabatic bulk free-radical runaway polymerization in a batch reactor can present several advantages:

1) When adiabatically polymerized, because the reaction equipment is not being used to cool the reacting mixture, there is not a significant temperature gradient at the walls of the reaction equipment. Such a temperature gradient can detrimentally broaden the molecular weight distribution of the polymer by making high molecular weight product in the cold boundary layer near the reactor wall, because of the free-radical reaction kinetics well known to those skilled in the art. For example, such high molecular weight components can degrade the coating performance of a hot-melt adhesive.

2) The reaction equipment utilized according to the method of the present invention is simple.

3) Because heat transfer requirements during reaction are eliminated, the method of the present invention more readily scales up from lab-scale (equipment to large production-scale equipment than temperature-controlled polymerization methods that rely on available heat transfer area to control reaction temperature.

4) Continuous polymerization reaction equipment contain various degrees of "backmixing" where there is a residence time distribution of the reacting material in the reaction equipment. Some of the reacting material can remain in the reaction equipment for extended periods of time to degrade product performance by continued attack by the free-radical initiator to form cross-linked polymer. Crosslinked gel particles can degrade product performance, such as the coating smoothness of a hot-melt adhesive.

5) Depending on the polymer and reaction conditions, essentially complete conversion of monomer to polymer is possible according to the method of the present invention. Based on specific product requirements, it may be necessary to react the final 1–15 weight % of monomer slowly (over a period of one to several hours) to minimize the formation of low molecular weight components as monomer depletes. Residence times of hours in continuous reaction equipment, such as an extruder, can be economically impractical.

The present invention provides a method of free radically polymerizing vinyl monomers comprising the steps of:

(a) providing a mixture comprising:
  (i) free radically (co)polymerizable vinyl monomers;
  (ii) optional chain transfer agent;
  (iii) optional crosslinking agent;
  (iv) at least one thermal free-radical initiator;
  (v) optionally a polymer comprising polymerized free radically polymerizable monomers;
in a batch reactor;

(b) deoxygenating the mixture, wherein step (b) can at least partially overlap with step (c);

(c) heating the mixture to a sufficient temperature to generate sufficient initiator free radicals from at least one thermal free radical initiator so as to initiate polymerization;

(d) allowing the mixture to polymerize under essentially adiabatic conditions to yield an at least partially polymerized mixture;

(e) optionally heating the mixture to generate free radicals from some or all of any initiator that has not generated initiator free radicals, followed by allowing the mixture to polymerize under essentially adiabatic conditions to yield a further polymerized mixtuire; and (f) optionally repeating step (e) one or more times.

Typically, more than one initiator is present in the mixture of step (a). More typically, 1 to 5 different initiators are present in the mixture of step (a). In some situations, 2, 3, 4 or 5 different initiators are present in the mixture of slep (a).

The present invention a method of free radically polymerizing vinyl monomers comprising the steps of:

(a) providing a mixture comprising:
  (i) free radically (co)polymerizable vinyl monomers;
  (ii) optional chain transfer agent,
  (iii) optional crosslinking agent;
  (iv) at least one thermal free-radical initiator;
  (v) optionally polymer comprising polymerized free radically polymerizable monomers;
in a batch reactor;

(b) deoxygenating the mixture if the mixture is not already deoxygenated, wherein step (b) can optionally at least partially overlap with step (c);

(c) heating the mixture to a sufficient temperature to generate sufficient initiator free radicals from at least one thermal free radical initiator so as to initiate polymerization;

(d) allowing the mixture to polymerize under essentially adiabatic conditions to yield and at least partially polymerized mixture;

(e) optionally heating the mixture to generate free radicals firom some or all of any initiator that has not generated initiator free radicals, followed by allowing the mixture to polymerize under essentially adiabatic conditions to yield a further polymerized mixture; and (f) optionally repeating step (e) one or more times.

(g) optionally cooling the mixture;

(h) adding to the mixture in the batch reactor at least one thermal free radical initiator wherein the initiator(s) of step (h) can be the same or different than the initiator(s) of step (a), optionally free ridically polymerizable monomers, optionally crosslinking agents, optionally chain transfer agent(s), optionally polymer comprising polymerized free radically polymerizable monomers, wherein the mixture optionally has a temperature below that which would generate initiator free radicals from the initiator(s) added in step (h);

(i) deoxygenating the mixture if the mixture is not already deoxygenated;

(j) optionally heating the mixture to generate initiator free radicals from at least one initiator to further polymerize the mixture if the mixture has a temperature below that which would generate initiator free radicals from the initiator(s) added in step (h);

(k) allowing the mixture to further polymerize under essentially adiabatic conditions to yield a further polymerized mixture;

(l) optionally heating the mixture to generate free radicals from some or all of any initiator that has not generated initiator free radicals, followed by allowing the mixture to polymerize under essentially adiabatic conditions to yield a further polymerized mixture;

(m) optionally repeating step (l) one or more times;

(n) optionally repeating steps (g) through (m) one or more limes.

Typically, more than one initiator is present in the mixture of step (a) and step (h). More typically, 1 or 2 different initiators are present in the mixture of step (a), 1 to 5 different initiators are present in step (h), and 1 to 5 different initiators are present in each repeat of steps (g) through (m) when step (n) is included. Most typically 2 to 5 different initiators are present in step (h), and 2 to 5 different initiators are present in each repeat of steps (g) through (k) when step (l) is included.

the negative value of the derivative of the initiator concentrations with respect to time for the initiators used in the second reaction cycle of Example 1.

Figure 2:
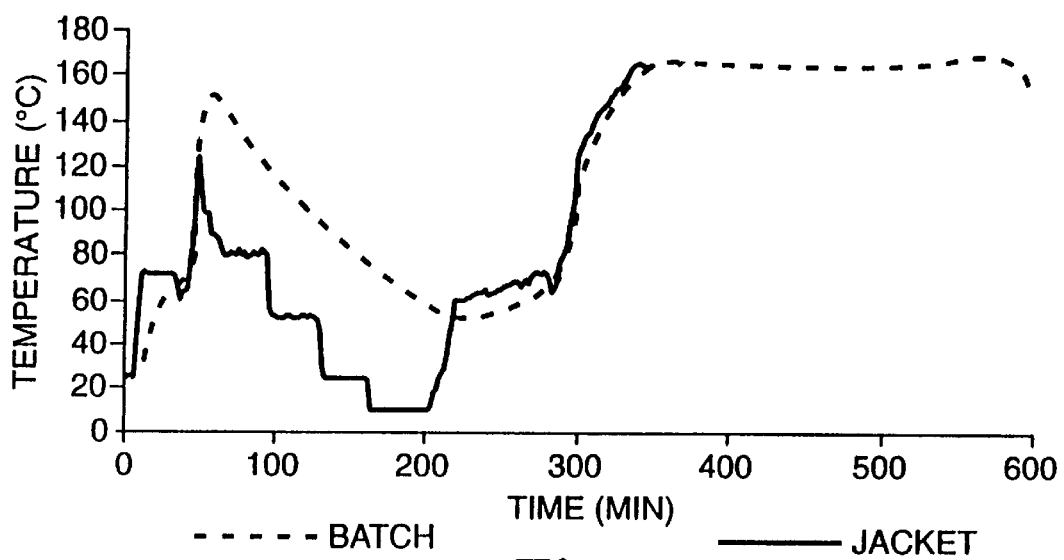

FIG. 2 illustrates the batch and jacket temperatures for the two reaction cycles of Example 1.

Figure 3:
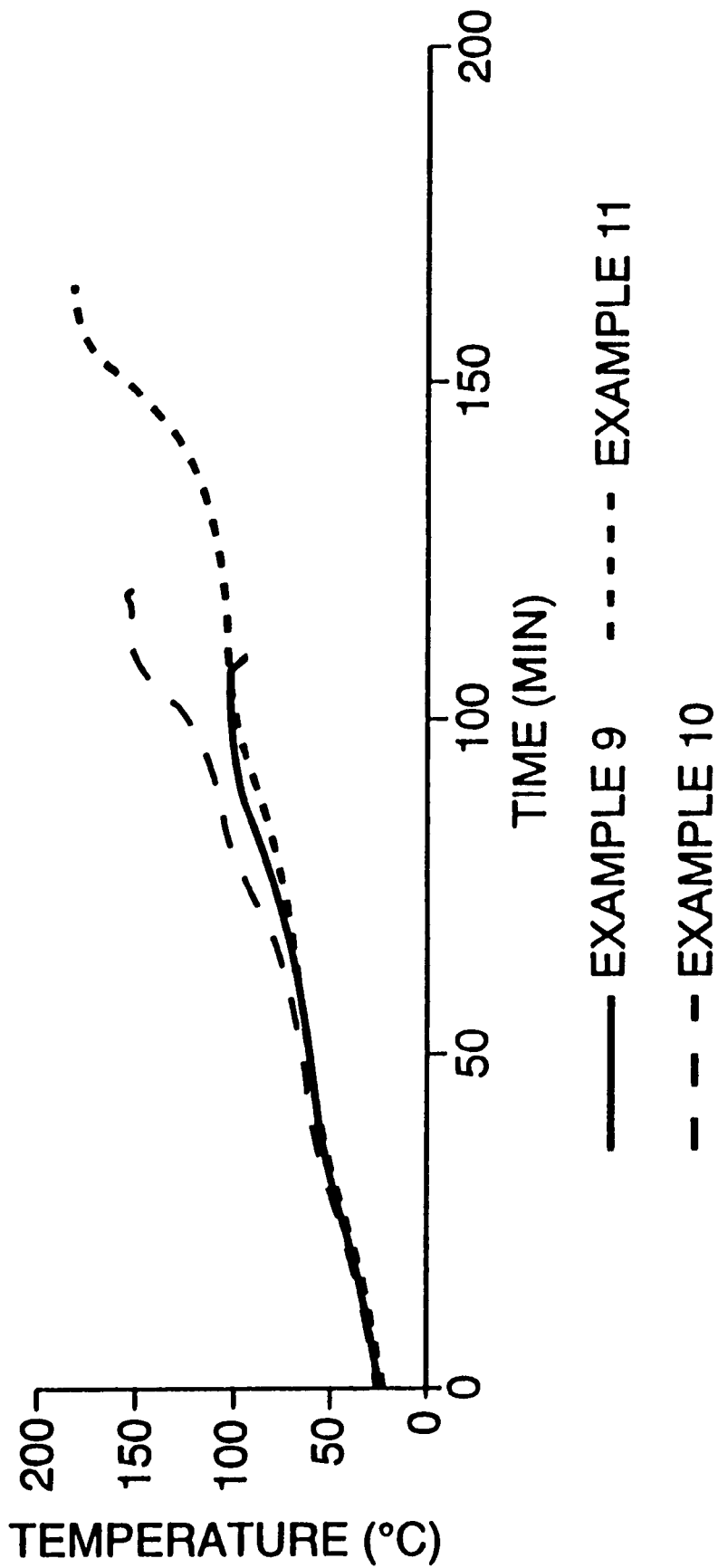

FIG. 3. Illustrates the measured temperature profiles for the essentially adiabatic polymerizations of Examples 9, 10, and 11.

DETAILED DESCRIPTION OF THE INVENTION

Batch Reactor

A batch reactor is used in the method of the present invention. By reacting batch wise is meant that the polymerization reaction occurs in a vessel where product is drained at the end of the reaction, not continuously while reacting. The raw materials can be charged to the vessel at one time prior to reacting, in steps over time while reacting, or continuously over a time period while reacting, and the reaction is allowed to proceed for the necessary amount of time to achieve, in this case, polymer properties including the desired polymerization amount, molecular weight, etc. If necessary, additives can be mixed into the batch prior to draining. When the processing is complete, the product is drained from the reaction vessel.

A typical batch reactor for this invention will comprise a pressure vessel constructed of material suitable for the polymerization, such as stainless steel which is commonly used for many types of free-radical polymerization. Typically, the pressure vessel will have ports for charging raw materials, removing product, emergency pressure relief, pressurizing the reactor with inert gas, pulling vacuum on the reactor head space, etc. Typically, the vessel is enclosed partially in a jacket through which a heat transfer fluid (such as water) is passed for heating and cooling the contents of the vessel. Typically, the vessel contains a stirring mechanism such as a motor-driven shaft inserted into the vessel to which stirring blades are attached. Commercial batch reaction equipment typically is sized in the range of about 10 to about 20,000 gallons (37.9 to 75,708 liters), and can be custom-built by the user or can be purchased from vendors such as Pfaudler-U.S., Inc. of Rochester, N.Y.

Safety Considerations

Extreme caution must be exercised to ensure that the reaction vessel can contain the elevated vapor pressure of the reaction mixture, at the temperatures that will be encountered, particularly if the reaction should proceed faster or further than desired because of an accidental overcharge/mischarge of initiator(s). It is also very important to ensure the reaction mixture will not decompose at the temperatures encountered to form gaseous product that could dangerously elevate the vessel pressure. Small-scale adiabatic calorimetric experiments, which one skilled in the art would be readily capable of performing, can be used to determine the runaway characteristics for particular monomers and initiator mixtures. For example, the Reactive System Screening Tool (RSST) or the Vent Sizing Package (VSP), both available from Fauske and Associates, Inc. of Burr Ridge, Ill., are devices capable of investigating runaway reaction characteristics and severity. Additional safety considerations are discussed elsewhere herein.

Free-Radically Polymerizable Vinyl Monomers

A variety of free radically polymerizable monomers can be used according to the method of the present invention. Typical monomers applicable for this invention include, but are not limited to, those acrylate monomers commonly used to produce acrylate pressure sensitive adhesives (PSA). The identity and relative amounts of such components are well known to those skilled in the art. Particularly preferred among acrylate monomers are alkyl acrylates, preferably a monofunctional unsaturated acrylate ester of a non-tertiary alkyl alcohol, wherein the alkyl group contains 1 to about 18 carbon atoms. Included within this class of monomers are, for example, isooctyl acrylate, isononyl acrylate, 2-ethylhexyl acrylate, decyl acrylate, dodecyl acrylate, n-butyl acrylate, hexyl acrylate, octadecyl acrylate, and mixtures thereof.

Optionally and preferably in preparing a PSA, polar copolymerizable monomers can be copolymerized with the acrylate monomers to improve adhesion of the final adhesive composition to metals and also improve cohesion in the final adhesive composition. Strongly polar and moderately polar copolymerizable monomers can be used.

Strongly polar copolymerizable monomers include but are not limited to these selected from the group consisting of acrylic acid, itaconic acid, hydroxyalkyl acrylates, cyanoalkyl acrylates, acrylamides, substituted acrylamides, and mixtures thereof. A strongly polar copolymerizable monomer preferably constitutes a minor amount, e.g. up to about 25 weight % of the monomer, more preferably up to 15 weight %, of the monomer mixture. When strongly polar copolymerizable monomers are present, the alkyl acrylate monomer generally constitutes a major amount of the monomers in the acrylate-containing mixture, e.g., at least about 75% by weight of the monomers.

Moderately polar copolymerizable monomers include but are not limited to those selected from the group consisting of N-vinyl pyrrolidone, N,N-dimethyl acrylamide, acrylonitrile, vinyl chloride, diallyl phthalate, and mixtures thereof. A moderately polar copolymerizable monomer preferably constitutes a minor amount, e.g., up to about 40 weight %, more preferably from 5 weight % to 40 weight %, of the monomer mixture. When moderately polar copolymerizable monomers are present, the alkyl acrylate monomer generally constitutes at least about 60 weight % of the monomer mixture.

Macromonomers are another monomer useful herein. Described in U.S. Pat. No. 4,732,808, incorporated by reference herein, is the use of free-radically copolymerizable macromonomers having the general formula X—(Y)$_n$—Z wherein X is a vinyl group copolymerizable with other monomer(s) in the reaction mixture;

Y is a divalent linking group; where n can be zero or one; and

Z is a monovalent polymeric moiety having a glass transition temperature, T$_g$, greater than about 20° C., and a weight average molecular weight in the range of about 2,000 to about 30,000 and being essentially unreactive under copolymerization conditions.

These macromonomers are generally used in mixtures with other (co)polymerizable monomer(s). The preferred macromonomer described in U.S. Pat. No. 4,732,808 may be further defined as having an X group which has the general formula

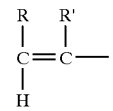

wherein R is a hydrogen atom or a —COOH group and R' is a hydrogen atom or methyl group. The double bond between the carbon atoms provides a copolymerizable moiety capable of copolymerizing with the other monomer(s) in the reaction mixture.

The preferred macromonomer includes a Z group which has the general formula

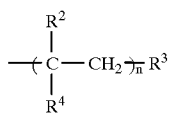

wherein $R^2$ is a hydrogen atom or a lower alkyl group (typically $C_1$ to $C^4$), $R^3$ is a lower alkyl group (typically $C_1$ to $C_4$), n is an integer from 20 to 500 arid $R^4$ is a monovalent radical selected from the group consisting of

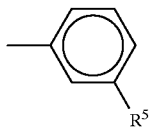

and $-CO_2R^6$ wherein $R^5$ is a hydrogen atom or a lower alkyl group (typically $C_1$ to $C_4$) and $R^6$ is a lower alkyl group (typically $C_1$ to $C_4$).

Preferably, the macromonomer has a general formula selected from the group consisting of

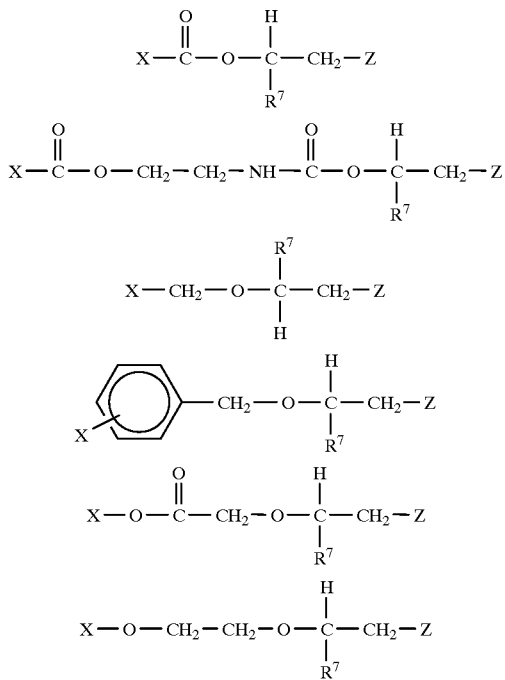

wherein $R^7$ is a hydrogen atom or lower alkyl group (typically $C_1$ to $C_4$).

The preferred macromonomer is a functionally terminated polymer having a single functional group (the vinyl group) and is sometimes identified as a "semitelechelic" polymer. (Vol. 27 "Functionally Terminal Polymers via Anionic Methods" D. N. Schultz et al., pages 427–440, *Anionic Polymerization*, American Chemical Society [1981].) Such macromonomers are known and may be prepared by the methods disclosed by Milkovich et al. in U.S. Pat. Nos. 3,786,116 and 3,842,059, the disclosures of which are incorporated herein by reference for the description of the preparation of the vinyl-terminated macromonomers. As disclosed therein, vinyl terminated macromonomer is prepared by anionic polymerization of polymerizable monomer to form a living polymer. Such monomers include those having an olefinic group, such as the vinyl-containing compounds. Living polymers are conveniently prepared by contacting the monomer with an alkali metal hydrocarbon or alkoxide salt in the presence of an inert organic solvent which does not participate in or interfere with the polymerization process. Monomers which are susceptible to anionic polymerization are well known. Illustrative species include vinyl aromatic compounds such as styrene, alpha-methylstyrene, vinyltoluene and its isomers or non-aromatic vinyl compounds such as methyl methacrylate. Other monomers susceptible to anionic polymerization are also useful.

The purpose of using a copolymerizable macromonomer include, but is not limited to enabling hot-melt coating of the PSA, but increasing the cohesive strength of the cooled extruded sheet PSA by the interaction of the pendant Z moieties on the polymer backbone. The amount of macromonomer used is generally within the range of about 1% to about 30%, preferably 1% to 7%, of the total weight of monomers. As mentioned previously "monomer" is defined herein to include macronionomer. The optional use of such macromonomers is included within the scope of the present invention. A particular advantage of the present invention is the ability to successfully copolymerize said macromonomers into the polymer backbone. In conventional, lower-temperature isothermal bulk polymerization, as polymerization proceeds, the macromonomer can precipitate out due to the immiscability of the macromonomer in the accumulating polymer, preventing the necessary polymerization of the macromonomer into the polymer backbone. In the practice of the present invention, because of the elevated temperatures obtained at high conversion, the successful use of free-radically copolymerizable macronionomers has been demonstrated.

Other monomer(s) for which the inventive method can be expected to be applicable include other members of the vinyl family such as monoalkenyl aromatic monomers including but not limited to those selected from the group consisting of styrene, alpha-methyl styrene, vinyl toluene, para-methyl styrene, tertiary butyl styrene, and mixtures thereof Other "acrylic monomers" for which the inventive process is expected to be applicable include but are not limited to those selected from the groups consisting of methacrylate esters such as methyl methacrylate, N-butyl methacrylate, hydroxy ethyl methacrylate, and dimethylaminoethylmethacrylate; and methacrylic derivatives, such as methacrylic acid, and salts thereof and methacrylonitrile. Other suitable nonacrylic ethylenic monomer(s) are expected to include vinyl esters such as vinyl acetate and maleic acid.

Chain Transfer Agents

Chain transfer agents which are well known in the polymerization art may also be included to control the molecular weight or other polymer properties. The term "chain transfer agent" as used herein also includes "telogens". Suitable chain transfer agents for use in the inventive process include but are not limited to those selected from the group consisting of carbon tetrabromide, hexanebromoethane, bromotrichloromethane, 2-mercaptoethanol, t-dodecylmercaptan, isooctylthioglycoate, 3-mercapto-1,2-propanediol, cumene, and mixtures thereof. Depending on the reactivity of a particular chain transfer agent and the amount of chain transfer desired, typically 0 to about 5 percent by weight of chain transfer agent is used, preferably 0 to about 0.5 weight percent, based upon the total weight of monomer(s).

Crosslinking

Crosslinking may also be used in the method of the invention. For example, in the art of hot-melt PSA manufacture, PSAs often require a curing step after they have been extruded in sheet form in order to give them good bond strength and toughness. This step, known as post curing, usually comprises exposing, the extruded sheet to some form of radiant energy, such as electron beam, or ultraviolet light with the use of a chemical crosslinking agent.

Examples of suitable crosslinking agents include but are not limited to those selected from the groups consisting of hydrogen abstraction type photocrosslinkers such as those based on benzophenones, acetophenones, anthraquinones, and the like. These crosslinking agents can be copolymerizable or non-copolymerizalle.

Examples of suitable non-copolymerizable hydrogen abstraction crosslinking agents include benzophenone, anthraquinones, and radiation-activatable crosslinking agents such as those described in U.S. Pat. No. 5,407,971. Such agents have the general formula

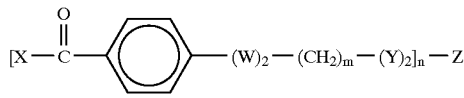

wherein W represents —O—, —N—, or —S—; X represents CH$_3$— or phenyl; Y represents a ketone, ester, or amide functionality; Z represents a polyfunctional organic segment that contains no hydrogen atoms more photoabstractable than hydrogen atoms of a polymer formed using the crosslinking agent; m represents an integer from 0 to 6; "a" represents 0 or 1; and n represents an integer 2 or greater. Depending on the amount of crosslinking desired and the efficiency of the particular crosslinker used, non-copolymerizable crosslinking agents are typically included in the amount of about 0% to about 10%, and preferred in the range of about 0.05% to about 2%, biased on total weight of the monomer(s).

Examples of suitable copolymerizable hydrogen abstraction crosslinking compounds include mono-ethylenically unsaturated aromatic ketone monomers free of orthoaromatic hydroxyl groups.

Examples of suitable free-radically copolymerizable crosslinking agents include but are not limited to those selected from the group consisting of 4-acryloxybenzophenone (ABP), para-acryloxyethoxybenophenone, and para-N-(methacryloxyethyl)-carbamoylethoxybenophenone. Copolymerizable chemical cross linking agents, are typically included in the amount of about 0% to about 2%, and preferred in the amount of about 0.025% to about 0.5%, based on the total weight of monomer(s). Other useful copolymerizable crosslinking agents are described in U.S. Pat. No. 4,737,559.

Solvents

In many cases, free-radical polymerization can take place without solvents, i.e., true bulk polymerization where the polymer formed as well as the monomers themselves all being miscible. However, the monomers may in some cases require a solvent in order to (co)polymerize. For example, acrylamides are dissolved in a small amount of solvent in order to make them miscible with isooctyl acrylate. Therefore, the inventive process includes within its scope the use of solvents which are nonreactive in the free radical polymerization being carried out. Such solvents usually comprise less than about 20 weight percent based on the total weight of the mixture. Useful solvents are those that are miscible in the mixture including but not limited to organic solvents such as toluene, hexane, pentane, and ethyl acetate. Solvents may also enhance the inventive process, so as to reduce the viscosity of the polymer at the end of the polymerization to facilitate draining or subsequent processing. Unless necessary, however, addition of solvents is not preferred because they can present the same disadvantages as solution polymerization, although to a lesser degree when the solvent concentration is low.

Optional Polymer

Optionally, polymer may be dissolved in the reaction mixture prior to the first essentially adiabatic reaction cycle. Alternatively and/or in addition the optional polymer may be included in subsequent essentially adiabatic reaction cycles. Such polymer may be included to modify the molecular weight distribution, molecular weight, or properties of the final polymer product after reacting is complete and generally will be non-reactive during the polymerization of the inventive process. Although it is not required, the polymer generally will be composed of the same monomer(s) as that to be reacted in the reaction mixture comprising the polymer, monomer(s), initiator(s), optional chain transfer agent(s), etc. Polymer dissolved in the monomer(s) prior to the first reaction cycle typically will be included in the range of about 0% to about 50% by weight and preferably less than about 0% to about 30% by weight, based on total weight of monomer(s) plus polymer. The use of polymer syrups to make acrylic polymers is explained in U.S. Pat. No. 4,181,752.

Free-Radical Initiators

Many possible thermal free radical initiators are known in the art of vinyl monomer polymerization and may be used in this invention. Typical thermal free radical polymerization initiators which are useful herein are organic peroxides, organic hydroperoxides, and azo-group initiators which produce free radicals. Useful organic peroxides include but are not limited to compounds such as benzoyl peroxide, di-t-amyl peroxide, t-butyl peroxy benzoate, and di-cumyl peroxide. Useful organic hydroperoxides include but are not limited to compounds such as t-amyl hydroperoxide and t-butyl hydroperoxide. Useful azo-group initiators include but are not limited to the VAZO™ compounds manufactured by DuPont, such as VAZO™ 52 (2,2'-azobis(2,4-dimethylpentanenitrile)), VAZO™ 64 (2,2'-azobis(2-methylpropanenitrile)), Vazo™ 67 (2,2'-azobis(2-methylbutanenitrile)), and VAZO™ 88 (2,2'-azobis (cyclohexanecarbonitrile)).

When the initiator(s) have been mixed into the monomers, there will be a temperature above which the mixture begins to react substantially (rate of temperature rise typically greater than about 0.1 ° C./min for essentially adiabatic conditions). This temperature, which depends on factors including the monomer(s) being reacted, the relative amounts of monomer(s), the particular initiator(s) being used, the amounts of initiator(s) used, and the amount of any polymer and/or any solvent in the reaction mixture, will be defined herein as the "runaway onset temperature". As an example, as the amount of an initiator is increased, its runaway onset temperature in the reaction mixture will decrease. At temperatures below the runaway onset temperature, the amount of polymerization proceeding will be practically negligible. At the runaway onset temperature, assuming the absence of reaction inhibitors and the presence of essentially adiabatic reaction conditions, the free radical polymerization begins to proceed at a meaningful rate and the temperature will start to accelerate upwards, commencing the runaway reaction.

According to the present invention, a sufficient amount of initiator(s) typically is used to carry the polymerization to the desired temperature and conversion. If too much initiator (s) is used, an excess of low molecular weight polymer will be produced thus broadening the molecular weight distribution. Low molecular weight components can degrade the polymer product performance. If too little initiator is used, the polymerization will not proceed appreciably and the reaction will either stop or will proceed at an impractical rate. The amount of an individual initiator used depends on factors including its efficiency, its molecular weight, the molecular weight(s) of the monomer(s), the heat(s) of reaction of the monomer(s), the types and amounts of other initiators included, etc. The total initiator amount, that for all initiator(s), typically is used in the range of about 0.0005 weight % to about 0.5 weight % and preferably in the range of about 0.001 weight % to about 0.1 weight % based on the total weight of monomer(s).

When more than one initiator is used in the reaction, as the first initiator depletes during an essentially adiabatic reaction (with the corresponding increasing reaction temperature), the second initiator may be selected such that it is thermally activated when the first initiator is becoming depleted. That is, as the first initiator is depleting, the reaction has brought the reaction mixture to the runaway onset temperature for the second initiator in the reaction mixture. An overlap is preferred such that before one initiator completely depletes another initiator activates (reaches its runaway onset temperature). Without an overlap, the polymerization rate can slow or essentially stop without external heating to bring the mixture to the runaway onset temperature of the next initiator in the series. This use of external heating defeats one of the benefits of the inventive process by adding the potential for nonuniform temperature distribution in the reaction mixture due to the external heating. However, polymerization still occurs under essentially adiabatic conditions which is an important feature of the invention.

Until the temperature increases towards the runaway onset temperature for an individual initiator in the batch, the initiator is essentially dormant, not appreciably decomposing to form free radicals. It will remain dormant until the reaction temperature increases towards its runaway onset temperature in the reaction mixture and/or until external heat is applied.

The succession of one initiator depleting and another reaching ills runaway onset temperature can continue as the temperature rises for virtually any number of thermal initiators in the reaction system. In the limit, a succession of virtually an infinite number of different initiators could be used with nearly complete overlap of the active temperature ranges between adjacent initiators in the succession to bring about the polymerization and the corresponding adiabatic temperature rise. In this case, the amount of each initiator used would need to be virtually infinitesimally small so as to not detrimentally broaden the molecular weight distribution.

Practically, to minimize raw material handling requirements, a reasonable minimum number of initiators should be used to achieve the desired amount of adiabatic polymerization and obtain the necessary polymer properties. Typically, 1 to 5 different initiators (more typically 2 to 5) are used during a particular reaction cycle. In some circumstances it may be advantageous to use 2, 3, 4, or 5 different initiators per reaction cycle.

To estimate the amount of overlap between successive initiators in a series during an essentially adiabatic polymerization, standard polymerization modeling techniques can be employed (i.e., W. H. Ray, "On the Mathematical Modeling of Polymerization Reactors," *J. Macromol. Sci. Macromol. Chem.*, C8(1), 1, 1972) and graphs similar to those shown in FIG. 1a and 1b can be made.

Alternatively, an essentially adiabatic polymerization can be conducted (i.e. using a small-scale adiabatic reaction calorimeter) and the temperature profile can be measured for a particular set of initiators. Based on the known decomposition rates of the initiators and the measured temperature profile, the concentration of each initiator versus time can be calculated. The calculation involves solving the following differential equation for $I_i$ versus time for each initiator i in the essentially adiabatic polymerization (i=1 to n, where n is the number of initiators in the reacting system):

$$\frac{dI_i}{dt} = -k_i I_i \qquad (2)$$

Here $I_i$ represents the concentration of initiator i at a given time, t represents time, and $k_i$ is the temperature dependent decomposition rate constant for initiator i. The rate constant $k_i$ is commonly represented by an Arrhenius relationship of the form $k_i = k_{ref,i} \exp\{-E_{a,i}(1/T - 1/T_{ref})/R\}$, where $E_{a,i}$ is the activation energy of the decomposition of initiator i, T is absolute temperature, $k_{ref,i}$ is the decomposition rate coefficient at a chosen reference temperature such as $T_{ref}=294$ K, and R is the Universal gas constant. For clarity, the index i for each initiator will be defined to be numbered 1 through n ordered by lowest temperature to highest temperature for each initiator i which produces a one-hour half life. The constants $E_{a,i}$ and $k_{ref,i}$ can be estimated from knowing the temperature-dependent decomposition characteristics of initiator i, data commonly available from commercial manufacturers of free radical initiators. For example, from knowing the half-life of initiator i at two different temperatures, $E_{a,i}$ and $k_{ref,i}$ can be estimated. Once $I_i$ is calculated versus time, multiplying $I_i$ at each time by $k_i$ at that time can be used to determine $$-\left(\frac{dI_i}{dt}\right)$$

versus time by direct substitution in the rate equation for initiator decomposition, Eq. 2. Plotting $$-\left(\frac{dI_i}{dt}\right)$$

versus temperature clearly illustrates the temperature overlap ranges of each initiator.

Figure 1A:
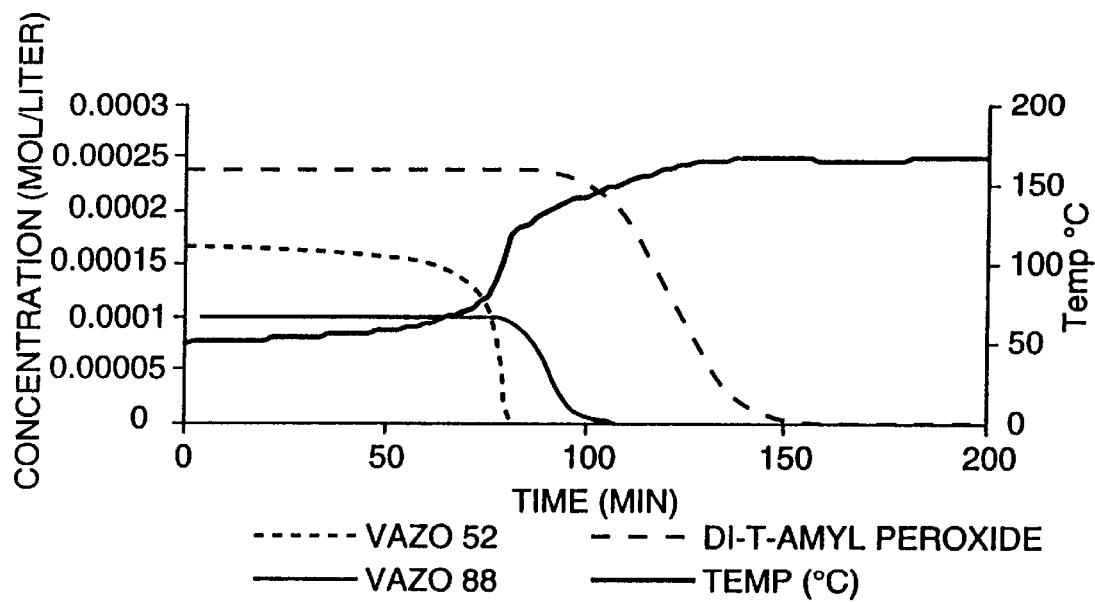
FIG. 1a illustrates the calculated initiator concentrations for the initiators used in the second reaction cycle of Example 1.
Figure 1B:
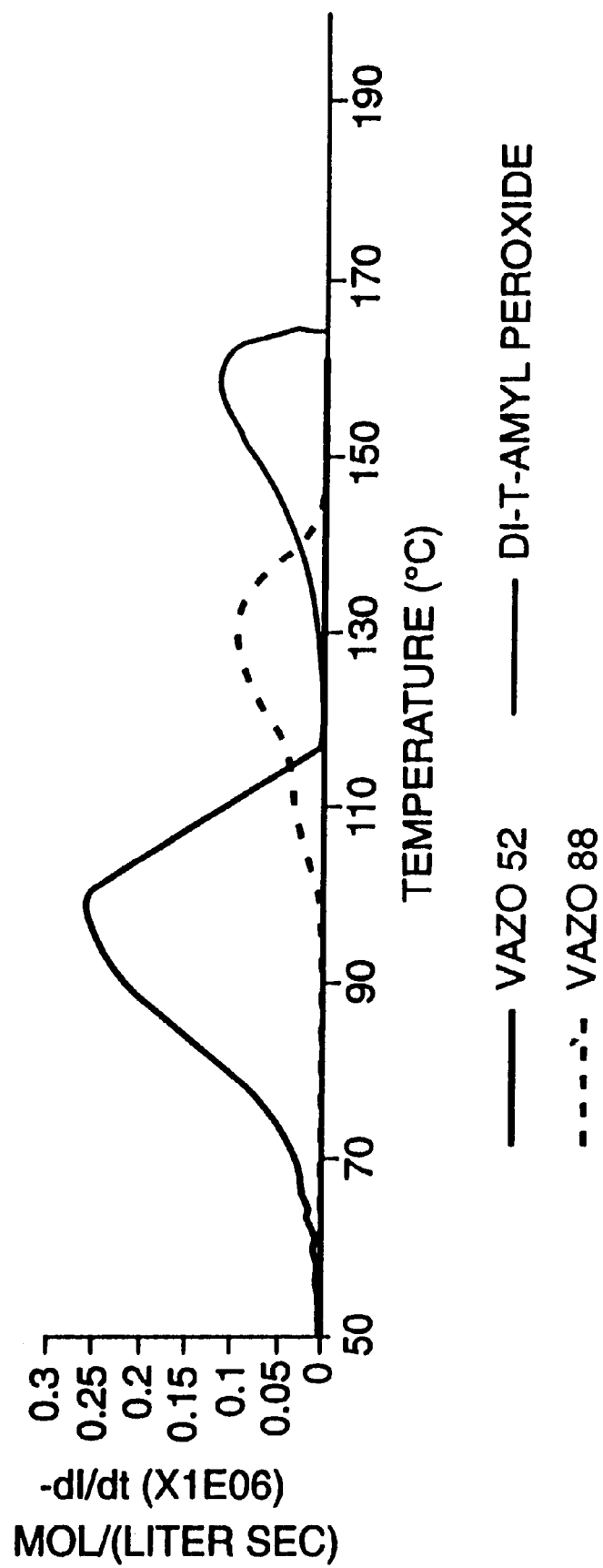
FIG. 1b illustrates the calculated values of $$-\left(\frac{d\,I_i}{d\,t}\right),$$

The calculated initiator concentrations shown in FIG. 1a and the $$-\left(\frac{dI_i}{dt}\right)$$

values shown in FIG. 1b were obtained using the measured temperature profile of the second reaction cycle of Example 1. The initiator depletion rate equation above was solved with the $E_{a,i}$ and $k_{ref,i}$ values for the Vazo 52, Vazo 88, and di-t-amyl peroxide initiators estimated based on half-life data available from the initiator manufacturers (the values used are presented in Table 1 below). As a close approximation, Eq. 2 for each initiator was solved analytically in one-minute intervals as though the reaction temperature was constant at the measured value until the next temperature measurement was available. This calculation method is accurate when solved over sufficiently small time intervals. Alternatively, standard numerical solution techniques may be used to calculate the estimated initiator concentrations, $I_i$, based on the measured adiabatic polymerization temperature profile and the known initiator decomposition rate data (i.e. Carnahan, et al., "Applied Numerical Methods", Wiley, 1969).

TABLE 1

| Initiator | $k_{ref}$ (sec$^{-1}$) | $E_a$ (kcal/mole) |
|---|---|---|
| Vazo 52 (i = 1) | 1.25e-7 | 31.0 |
| Vazo 88 (i = 2) | 9.43e-10 | 31.3 |
| Di-t-amyl peroxide (i = 3) | 1.10e-12 | 37.7 |

In the method of the present invention, a preferred minimum and maximum overlap of the active temperature ranges of two or more initiators during an essentially adiabatic reaction will be as follows.

Minimum Initiator Overlap

It is preferred that prior to the $$-\left(\frac{d I_i}{d t}\right)$$

for at least one (preferably each) initiator i (i≦n-1, n>1, where i=1, ..., n) decreasing to about 10% of its maximum value, the value of $$-\left(\frac{d I_{i+1}}{d t}\right)$$

for the next initiator to reach it runaway onset temperature in the series will increase to at least about 20% of its maximum value, as the reaction temperature increases due to essentially adiabatic polymerization. In reacting in this manner, the essentially adiabatic polymerization will proceed without the need for heating between the runaway onset temperatures of the initiators.

Maximum Initiator Overlap

It is preferred that prior to the $$-\left(\frac{d I_i}{d t}\right)$$

for at least one (preferably each) initiator i in a series (i>1, n>1, where i=1, ..., n) reaching about 30% of its maximum value, the previous initiator in the series has already reached its maximum value of $$-\left(\frac{d I_{i-1}}{d t}\right),$$

as the reaction temperature increases due to essentially adiabatic polymerization. In reacting in this manner, the number of initiators used will be kept at a reasonable minimum number.

A particular initiator used is selected based upon its thermal decomposition characteristics. For example, di-cumyl peroxide and di-t-amyl peroxide have similar temperature decomposition characteristics to produce free radicals (i.e., similar half-lives at various temperatures) and may be reasonable substitutes for each other in some instances. Apart from the temperature decomposition characteristics, other considerations in initiator selection may include an initiator's toxicity, cost, and potential side reactions in the polymerization system (such as minimizing undesired crosslinking of the polymer).

Typical initiators, in the order that they become activated as the temperature increases, include: Vazo™ 52 (2,2'-azobis (2,4-dimethylpentanenitrile)) Vazo™ 88 (2,2'-azobis (cyclohexanecarbonitrile)), di-t-amyl peroxide, and t-amyl hydroperoxide. These initiators, for common monomers being reacted, typically are "spaced" in their temperature decomposition characteristics to overlap sufficiently to perform adiabatic polymerization without the need for external heating. Different, or additional, initiators may be necessary, depending on the monomer(s) employed. Factors affecting the initiator(s) employed include but are not limited to the rate of reaction of the monomer(s), the heat of reaction of the monomers, and the heat capacity of the reaction mixture.

In the case that there will be more than one reaction cycle, the initiator(s) for the first essentially adiabatic reaction cycle are typically selected to bring the reaction to a temperature/conversion level where:

1) The polymerization reaction virtually stops when the initiator(s) have essentially depleted (i.e., initiator(s) more than 99% depleted). The temperature of the reaction mixture is such that thermal polymerization of the monomers (polymerization in the absence of added free radical initiators) in the polymer/monomer reaction mixture is practically negligible. This is important so that the reaction can be stopped with available heat transfer from the reactor jacket (and potentially augmented with external cooling such as that from external cooling from pumping the reaction fluid through a heat exchanger, etc.).

2) The solution viscosity is such that when the reaction mixture is cooled prior to the next reaction cycle, the next initiator(s), optional chain transfer agent, optional additional monomers, optional polymer, etc., can be mixed into the batch. This viscosity will be typically less than about 200,000 centipoise (Brookfield viscosity at mixing temperature) for a common batch reactor system.

Method of the Invention

Typical reaction(s) with the inventive process proceed as follows. The monomer(s) are charged to the reactor in the desired amount(s). The temperature of the reaction vessel must be cool enough so that virtually no thermal polymerization of the monomer(s) will occur and also cool enough so that virtually no polymerization will occur when the initiator(s) are added to the batch. Also, care should be taken to ensure the reactor is dry, in particular, free of any undesired volatile solvent (such as reactor cleaning solvent) which potentially could dangerously elevate the pressure of the reaction vessel as the temperature increases due to heat of polymerization. The initiator(s), optional chain transfer agents, optional polymer, optional crosslinking agents, optional solvent, etc., are also charged to the reactor.

Prior to warming the reaction mixture as described below (or optionally simultaneously while warming the batch), after adding all components to the batch as described above, the batch is purged of oxygen, a free-radical polymerization inhibitor. De-oxygenation procedures are well known to those skilled in the art of free-radical polymerization. For example, de-oxygenation can be accomplished by bubbling an inert gas such as nitrogen through the batch to displace dissolved oxygen.

After completing the de-oxygenation, the head space in the reactor is typically pressurized with an inert gas such as nitrogen to a level necessary to suppress boiling of the reaction mixture as the temperature rises during reaction.

The inert gas pressure also prevents oxygen from entering the polymerization mixture through possible small leaks in the reaction equipment while polymerization is in progress.

From heating provided by the jacket on the reactor, the reaction mixture temperature typically is raised to or in a range about 1° C. to about 5° C. above the runaway onset temperature with sufficient mixing in the batch to have an essentially uniform temperature in the batch. The batch temperature controller is typically set temporarily to maintain the batch at the runaway onset temperature. Once the jacket temperature begins to drop as necessary to hold the batch at the runaway onset temperature, this indicates that the polymerization has begun. The reaction may not proceed immediately when the batch is brought to the runaway onset temperature because it may take time to deplete reaction inhibitors that are typically shipped with the monomer (to prevent unwanted polymerization during shipping and handling), other trace impurities, or any oxygen still dissolved in the reaction mixture. As soon as the jacket temperature drops, the reactor jacket temperature control system is set to track the batch temperature as it increases, due to reaction, to facilitate essentially adiabatic reaction conditions. In the practice of the inventive process, it has been found beneficial to have the jacket track about 1° C. to about 10° C. above the batch to warm the reactor walls from the jacket as opposed to warming the reactor walls from the heat of reaction of the mixture, making the reacting system more adiabatic. Acknowledged is the fact that perfect adiabiticity is probably not attainable because there will typically be a small amount of heat transferred from the reacting medium to the internal agitator blades and shaft as well as the mixing baffles in the reactor. In the practice of this invention the effect of heat loss to heating the agitator shaft and blades, baffles, temperature probes, etc., has been found to be negligible.

An alternate heating approach would be to gently warm the batch past the runaway onset temperature with heat input from the jacket to warm the batch at a rate of about 0.1° C./min to about 0.5° C./min and continue the heating through the reaction cycle (similar to the heating approach above with the jacket tracking about 1° C. to about 10° C. above the batch temperature). As in the heating approach above, continued heating through the reaction cycle would serve to offset the heat loss to the reaction equipment and maintain essentially adiabatic reaction conditions. In the practice of the present invention, the first heating approach described above appears preferable because it ensures the reaction will always commence at the same temperature which seems to produce more reproducible product from batch to batch.

Once the reaction temperature has peaked, due to the depletion of the thermal initiator(s) as well as negligible reaction of the monomers from thermal polymerization, the polymer content at this point is typically about 30–80% by weight based on the total weight of monomer(s) and polymer.

If desired, the polymerization cycles can be stopped at this point and the unreacted monomer stripped from the reaction mixture or further polymerized in other equipment. Stripping apparatuses for the purpose of removing residual monomer are well known to those skilled in polymerization art. One potential stripping apparatus is an extractor-extruder operating with sections vented to vacuum chambers wherein the monomer can be condensed and optionally reused in subsequent polymerizations. Typical extractor-extruders are referred to in *Modern Plastics Encyclopedia*, Volume 45, October 1968 and Volume 46, October 1969, both published by McGraw-Hill.

A potential benefit of stopping the polymerization without reacting to completion is that the molecular weight distribution has been found to broaden as conversion increases towards completion. Product property requirements could warrant the extra effort and cost of stripping versus reacting to completion. Another reason to cease the polymerization process at partial conversion would be to limit the solution viscosity at manageable levels. For example, as the polymer molecular weight increases, the solution viscosity will increase. If high molecular weight polymer is to be produced and the 100% conversion melt viscosity is not manageable, i.e. greater than about 200,000 to about 500,000 centipoise (Brookfield viscosity at temperature), stopping the reaction at less than 100% conversion could be beneficial.

When the reaction system is to be further polymerized in one or more essentially adiabatic reaction cycles, the batch temperature typically is cooled prior to beginning the next reaction cycle. Generally the batch is cooled about 5–20° C. below the runway onset temperature of the initiator used in the next reaction cycle. If more than one initiator is used the batch temperature is typically cooled at least about 5–20° C. below the runaway onset temperature of the initiator having the lowest runaway onset temperature.

As the partially polymerized reaction mixture cools, its viscosity will increase. Optionally, if necessary, additional monomer(s) can be added to the batch before it has fully cooled to compensate for the increasing viscosity. Typically, if necessary, a relatively small amount will be added. Charging additional monomer in the amount less than about 30 weight % of the amount of monomer added in the first reaction cycle is preferred. While the batch is cooling or when it has cooled to the desired temperature, optionally more monomer(s) can be added to adjust monomer ratios to compensate for unequal reactivity ratios of the monomers in the previous reaction cycle. Similarly, monomer(s) not included in an earlier reaction cycle can be added to tailor the polymer properties as needed. Monomer addition may also be performed as an in-process correction to compensate for slight batch-to-batch variations in the amount of reaction conversion obtained in a previous reaction cycle.

When the batch has cooled to the desired temperature, the additional initiator(s) are added to the batch. Optionally, additional chain transfer agent(s) can be added. Adjusting the amount of chain transfer agent can provide an in-process correction for the product molecular weight obtained from the previous reaction cycle. Other additives, including optional photocrosslinking agents, optional polymer, optional solvent, etc., can also be added at this time.

The batch is de-oxygenated, warmed to the runway onset temperature of the initiator having the lowest runaway onset temperature, and reacted essentially adiabatically as described above for the previous reaction cycle.

If necessary, additional reaction cycles can be performed to continue increasing conversion to the desired level.

Optionally, when all of the reaction cycles are complete, unreacted monomer can be stripped from the batch by pulling vacuum on the hot reaction product in the batch reactor by external vacuum equipment such as a vacuum pump and optionally condensing monomer vapors in an external heat exchanger with cooling.

Optionally additives including but not limited to those selected from the group consisting of plasticizers, tackifiers, antioxidants, stabilizers, and mixtures thereof, can be added at this time by mixing one or more of them into the moltei polymer product. The identity and relative amounts of such components are well known to those skilled in the art. For example, the antioxidant/stabilizer Irganox™ 1010 (tetrakis (methylene(3,5-di-tert-butyl-4-hydroxyhydrocinnamate)) methane), manufactured by Ciba-Geigy Corporation, can be mixed into the polymer to increase the temperature stability of the polymer. Antioxidant is typically used in the range of about 0.01% to about 1.0% based on the total weight of the polymer product.

The reaction mixture's viscosity at the temperature at the end of the final reaction cycle is preferably less than about 200,000 to about 500,000 centipoise (Brookfield viscosity at draining temperature) to permit draining of the molten polymer from the reactor and optionally mixing additives into the batch. Typically, inert gas (such as nitrogen) pressure in the head space of the reactor car be used to hasten the draining of the product from the reactor.

After the reaction mixture is drained, an apparatus such as an extractor-extruder can be used to strip unreacted monomer and/or any solvent that optionally was added to the batch, or further process the polymer by mixing in additives comprising plasticizers, tackifiers, antioxidants and/or stabilizers, and extruding the polymer into the physical form that it is intended to be used (i.e. in sheet form for a PSA).

The invention will be further clarified by consideration of the following examples which are intended to be purely exemplary. All parts, percentages, ratios, etc., in the examples and elsewhere herein are by weight unless indicated otherwise.

Preparation of Sample for Adhesion Test

The copolymers made for PSA were dissolved in ethyl acetate 50% by weight of polymer plus ethyl acetate. The solutions were knife coated on 38 micrometer thick primed polyester film to about a 25 micrometer dried coating thickness (exact thickness is reported in the examples below). The copolymer PSAs thus coated were immediately dried for ten minutes in a 65° C. oven followed by optional exposure to ultraviolet light (UV) for post curing of the adhesive (see "UV Curing Equipment" below) and then aging for about sixteen hours at 22° C. and 50% relative humidity prior to testing. The coated sheet thus prepared was ready for testing as described under "Peel Adhesion Test".

UV Curing Equipment

Two different pieces of equipment were used as sources of UV radiation for curing the adhesive samples in the examples below. They were the PPG UV processor, PPG Industries, Inc., Blainfield, Ill., and the Fusion Systems Curing Unit, Fusion Systems Corp., Rockville, Md. The PPG UV processor is equipped with two medium pressure mercury lamps which have a spectral output between 240 and 740 nm with emissions primarily in the 270 to 450 nm output range. The Fusion Systems Curing Unit use UV lamps having a power supply of 300 watts/inch (118 watts/cm). The "H" bulbs available from Fusion Systems Corp. were used. The UV radiation dose amount was controlled by the power settings on the respective device, the conveyor speed setting, and the number of passes of the adhesive under the ultraviolet light.

Peel Adhesion Test

Peel adhesion is measured as the force required to remove a coated flexible sheet material from a test panel, measured at a specified angle and rate of removal. The details of this test are given in "Test Methods for Pressure Sensitive Tapes", Eighth Edition, Revised August 1980. The procedure is summarized as follows:

1. A 12.7 mm width of coated sheet is applied to the horizontal surface of a clean glass test plate with at least 12.7 lineal centimeters in firm contact. A 2 kg hard rubber roll is used to apply the strip.
2. The free end of the coated strip is doubled back nearly touching itself so the angle of the removal is 180°. The free end is attached to the adhesion tester scale.
3. The glass test plate is attached to the table of an IMASS™ adhesion testing machine manufactured by Instrumentors, Inc. which is capable of moving the table away from the scale at a constant rate of 2.3 meters per minute.
4. The force required for the removal is reported as an average of a range of numbers recorded by the testing apparatus. This value is reported as Newtons per 100 millimeters (N/100 mm) of width according to PSTC-1.

Shear Strength—Holding Power Test (PSTC No. 7—Eight Edition—1985)

This test measures the time required to pull a PSA tape from a standard flat surface in a direction parallel to that surface under the stress of a standard, constant load. The value is expressed in units of time (minutes) per unit area. It is a measure of the cohesive strength of the polymeric material. The conditions under which the examples in this application were measured follows:

1. Surface=stainless steel panel
2. Tape area 12.7 mm by 12.7 mm
3. Panel area =178° *
4. Constant Load=1 kilogram

* 2° less than 180° to negate any peel forces thereby insuring that only shear forces are measured. PSTC No. 7 is found in "Test Methods", Pressure Sensitive Tape Council, 1800 Pickwick Ave., Olenview, Ill. 60025 (August 1985).

Molecular Weight and Molecular Weight Distribution

The characterization of the molecular weight distribution of polymers has been done by size exclusion chromatography, also known as gel permeation chromatography (GPC). GPC test methods are explained in *Modern Size Exclusion Liquid Chromatography, Practice of Gel Permeation Chromatography*, John Wiley & Sons, 1979.

In the examples, the term $M_w$ means weight-average molecular weight, and the term $M_n$ means number-average molecular weight both of which are terms well understood in the polymer art. The term polydispersity is the ratio of $M_w/M_n$.

Samples were prepared for GPC as follows:

(1) The polymer sample was dissolved at a concentration of 20 mg/ml in tetrahydrofuran at room temperature to make a total of about 10 ml of solution.
(2) If the polymer contained acrylic acid, then the solution was treated with saturated diazomethane in diethyl ether by adding 5 ml of such solution drop-wise while stirring. If no acrylic acid is present in the polymer, proceed directly to Step 5 below.
(3) The resulting mixture was reduced to about 1 ml volume by evaporation under a stream of air.
(4) Tetrahydrofuran was added to bring sample volume to 10 ml.
(5) The resulting fluid was filtered through a 0.45 micrometer Teflon™ filter in a syringe to prevent plugging of the GPC column by the sample.
(6) The resulting filtrate was used for chromatographic analysis.

A Waters model 150-C ALC/GPC, available from Millipore Corp., Milford, Mass., operated at 45° C. with a tetrahydrofuran carrier stream flowing at 1 ml/min (200 microliter sample injection volume) was used for GPC analysis. A refractive index detector was used. Polystyrene standards from Polymer Laboratories, Ltd., were used in the range molecular weight range of 162 to 3,150,000. Six columns (Phenogel™ columns made by Phenomenex Co.) with pore sizes from 100 Å to $10^6$ Å were used.

Monomer Conversion to Polymer

In the examples below, extent of polymerization, or the amount of conversion of monomer to polymer was measured by one of two methods: gas chromatography (GC) or by a solids measurement. Two different GC methods were employed. One GC method was used when only %IOA (% isooctyl acrylate monomer in the sample by weight) is reported, and a different GC method was used when both %IOA and %AA (% acrylic acid monomer in the sample by weight) are reported.

%IOA

A Hewlett-Packard Model 5890 gas chromatograph was used fbr measuring the weight percent of unreacted isooctyl acrylate (%IOA) with the following conditions:

Column—Type: stainless steel
  Length: 12 foot (3.658 m)
  Inner Diameter: ⅛ inch (0.3175 cm)
  Packing manufactured by Supelco Co. of Bellefonte, Pa. (Liquid phase 20% SP2100, Solid support 80/100 mesh Supelcoport)
Oven Temperature—210° C. (Isothermal)
Detector—Thermal Conductivity (TCD)
Sensitivity Setting: High
Injector Temperature—250° C.
Detector Temperature—300° C.
Sample size—3 microliters
Run Time—5 minutes
Carrier Gas—Helium An internal standard solution containing the monomer (e.g. isooctyl acrylate) to be detected and a substance determined to have a similar detector response and a non-similar elution time, called the internal standard spiking compound (ISSC) is prepared in a vial. The concentration in the standard of the monomer being tested and that of the ISSC are both 1.00% by weight in a suitable solvent.

The standard is injected. The area under the analyte peak and under the ISSC peak in the time versus detector response plot of the chromatographic run of the standard are then measured. Calculations are then made to determine the relative detector response factors for the two compounds.

An aliquot of the sample of unknown residual monomer is diluted to 10% by weight with a suitable solvent to reduce the viscosity of the sample. The ISSC is added to the mixture in a weight equal to 5% of the weight of the sample before diluting with the solvent. The sample is injected.

The area under the analyte peak and under the ISSC peak in the time versus detector response plot of the chromatographic run of the diluted sample are then measured. Calculations are then made to determine the residual levels of the monomers in the sample using the measured areas and the relative response factors previously determined.

%IOA and %AA

A Hewlett-Packard Model 5890 gas chromatograph was used for measuring the weight percent of unreacted isooctyl acrylate (%IOA) and unreacted acrylic acid (%AA) with the following conditions:

Column—Type: Capillary
  Length: 15 meter
  Inner Diameter: 0.53 millimeter
  Liquid phase: HP-FFAP (manufactured by Hewlett-Packard)
  Film Thickness: 3 micrometer
Split Flow—80 ml/min at 50° C.
Oven Temperature Program:

| Initial Temperature - 50° C. | | Initial Time - 0.5 minutes | |
|---|---|---|---|
| | Rate (° C./minute) | Final Temperature (° C.) | Final Time (minutes) |
| Level 1 | 20 | 100 | 0 |
| Level 2 | 30 | 250 | 2 |

Detector—Flame Ionization (FID)
Injector Temperature—250° C.
Detector Temperature—300° C.
Sample size—1 microliters
Run time—5 minutes
Carrier Gas—Helium—10 ml/min at 50° C.

An aliquot of a sample of unknown residual monomer levels is diluted to 10% by weight with acetone to reduce the viscosity of the sample.

An external standard solution containing the residual monomers (e.g. isooctyl acrylate, acrylic acid) at known concentrations in acetone are prepared in a vial. The concentrations of the monomers in the standard are selected close to the expected concentrations of the monomers in the diluted sample of unknown residual monomers.

Equal volumes of the standard solution and the diluted sample are injected under identical conditions. The areas under the analyte peaks in the time versus detector response plot of the chromatographic run of the standard solution and of the diluted sample are then measured. Calculations are then made to d(termine the residual levels of the monomers in the sample.

Solids Measurement

About 0.5–1.0 gm of polymer sample was placed in a small tin. The polymer-containing tin was placed in a convection oven at 120–130° C. for at least three hours, or until weight loss by evaporation could not be measured any longer. By the measured weight loss of evaporated monomer, the amount of monomer converted to polymer can be calculated (expressed in percent in the examples below).

Inherent Viscosity

The inherent viscosities (IV) reported herein were obtained by conventional methods used by those skilled in the art. The IVs were obtained using a Cannon-Fenske #50 viscometer in a water bath controlled at 25° C., to measure the flow time of 10 ml of a polymer solution (0.2 g per deciliter polymer in ethyl acetate). The test procedure followed and the apparatus used are described in detail in *Textbook of Polymer Science*, F. W. Billmeyer, Wiley-Interscience, Second Edition, 1971, Pages 84 and 85.

EXAMPLE 1

This example illustrates the use of the inventive process to produce a hot-melt acrylate pressure sensitive adhesive (isooctyl acrylate/acrylic acid monomer ratio: 90/10). Two essentially adiabatic reaction cycles are used in combination with a vacuum strip of residual unreacted monomer after the reaction cycles are completed.

The following components were charged to a 75-gallon (284 liter) stainless steel batch reactor: 414.0 lbs. (187.78 kg) of isooctyl acrylate (IOA), 5.0 grams of Vazo™ 52 (2,2'-azobis(2,4-dimethylpentanenitrile)), 208.7 grams of carbon tetrabromide, 1605.0 grams of a 26 weight % solids mixture of 4-acryloxy benzophenone (ABP) in ethyl acetate, and 46.0 lbs. (20.87 kg) of acrylic acid (AA). With the mixture held at 75° F. (23.89° C.), nitrogen was bubbled through the solution for 20 minutes to displace oxygen from the mixture and the reactor head space (volume of reactor not occupied by reaction mixture). The reactor was pressured to about 50 psig (448.16 kPa) with nitrogen and sealed. With the reactor's agitator (a 3-blade, retreating blade agitator) turning at about 75 revolutions per minute, the temperature of the mixture was raised to 150° F. (65.56° C.) by temperature-controlled water circulating through the jacket on the reactor. Once the polymerization had begun, the temperature control system was set to cause the temperature of the water circulating through the jacket to track 10° F. (5.56° C.) above the batch temperature to facilitate adiabatic reaction conditions. About 3 minutes into the reaction, as a final oxygen purge, the reactor pressure was vented to 5 psig (137.89 kPa) and then pressured back to about 50 psig (448.16 kPa) with nitrogen. As shown in FIG. 2, after about 10 minutes into the reaction, the batch temperature reached about 286° F. (141.1 1° C.) and the jacket temperature control system was unable to keep pace with the rate of batch temperature rise. At this point the jacket was drained and the reaction temperature kept climbing. Seven minutes later, the reaction temperature peaked at 298° F. (147.78° C.) at which time cooling was applied to the jacket on the reactor.

A sample was taken of the reaction mixture. The polymer IV was 0.51 dl/gm and the unreacted IOA in the mixture was 61 weight % based on the total weight of the mixture.

Once the batch temperature cooled to 125° F. (51.67° C.), the nitrogen pressure on the reactor was vented. Next, using external steam ejectors, the pressure on the reactor head space was reduced (vacuum pulled on reactor head space) to an absolute (as opposed to gauge pressure) of about 7.5 psi (51.71 kPa) and the reactor was sealed. Then the following mixture was vacuum charged to the reaction mixture (sucked into the reactor) through a dip tube into the reaction mixture: 10.0 grams of Vazo™ 52 (2,2'-azobis(2,4-dimethylpentanenitrile)), 6.0 grams of Vazo™ 88 (2,2'-azobis(cyclohexanecarbonitrile)), 10.0 grams of di-t-amyl peroxide, 30.0 grams of carbon tetrabromide, dissolved in 5 lbs. (2.27 kg) of IOA. As a charge line flush, 5 more lbs. (2.27 kg) of IOA was vacuum charged to the reaction mixture through the dip tube.

The reactor temperature control system was set to raise the batch temperature to 150° F. (65.56° C.). While the batch was warming to 150° F. (65.56° C.), with the agitation set at about 75 revolutions per minute, the reaction mixture was purged of oxygen using the following procedure: a vacuum was pulled on the reactor head space to cause vigorous bubbling of the reaction mixture caused by trapped nitrogen from the first reaction cycle to be liberated from the mixture for about 30 seconds. Then the reactor pressure was raised to about 3 psig (124.11 kPa) with nitrogen and held for about 1 minute. Again a vacuum was pulled to cause trapped nitrogen to de-gas from the reaction mixture for about 30 seconds. Next the reactor head space was pressured to 50 psig (448.16 kPa) and held for about 1 minute. The reactor pressure was vented to about 3 psig (124.11 kPa) and held for about 1 minute. Finally, the reactor pressure was raised to 50 psig (448.16 kpa) with nitrogen the reactor was sealed.

Once the mixture reached 150° F. (65.56° C.), and the polymerization had begun, the temperature control system was set to cause the temperature of the water circulating through the jacket to track 10° F. (5.56° C.) above the batch temperature to facilitate adiabatic reaction conditions. The batch temperature rose over a period of about an hour as shown in FIG. 2. Once the batch temperature peaked at about 328° F. (164.44° C.), the jacket was drained and steam at a pressure of about 110 psig (861.84 kPa) was applied to the jacket to hold the reaction mixture at about 330° F. (1 65.56° C.) for about 40 more minutes (the temperature of the jacket past the point where direct steam was applied is not shown in FIG. 2 because the temperature probe was not properly positioned in the jacket piping to measure the jacket temperature when using direct steam).

At this point 208.7 grams of lrganox™ 1010 thermal stabilizer/antioxidant (tetrakis(methylene(3,5-di-tert-butyl-4-hydroxyhydroctnnamate))methane), manufactured by Ciba-Geigy Corporation, dissolved in 400 grams of ethyl acetate was pressure-charged through a dip tube into the reaction mixture. A charge line flush of 200 more grams of ethyl acetate was next pressure charged to the reaction mixture through the dip tube. The reactor head space pressure was vented to about 5 psig (137.89 kPa). The batch was mixed at 330° F. (165.56° C.) with about 75 revolutions per minute agitation for about 12 hours (this is longer than necessary to mix the thermal stabilizer into the batch, but because of a 2-shift operation in our pilot plant, the processing was on hold overnight).

Next, the unreacted residual monomer and residual ethyl acetate was stripped from the reaction mixture under reduced vacuum at 330–340° F. (165.56–171.11° C.). Vapors were condensed in an external heat exchanger. At this point, the polymer product Brookfield viscosity (measured at 180° C.) was about 60,000 centipoise.

The product readily drained from the reactor with a slight nitrogen pressure on the head space. The resulting polymer product had the following properties:

unreacted IOA: 2.1 weight % based on total weight of the mixture unreacted AA: 0.2 weight % based on total weight of the mixture IV: 0.61 dl/gm $M_n$: 15,000

$M_w$: 270,000

$M_w/M_n$: 18

To test the adhesive properties of the polymer product, adhesion and shear tests were conducted with the coated product adhesive (25 micrometer dried coating thickness). The adhesive coating was very smooth, with a glass-like finish, free of any visible polymer gel particles. The adhesive was post cured by exposure to ultraviolet radiation. Three different levels of UV radiation were used to cure the adhesive as shown in Table 2. A control, without any post cure, is also included in the results in Table 2.

TABLE 2

| UV Dose | Adhesion (N/100 mm) | Shear (min) |
|---|---|---|
| 0 (control) | 62.0 | 13 |
| 100 mJ/cm$^2$ | 65.2 | 3002 |
| 200 mJ/cm$^2$ | 65.7 | 4271 |
| 400 m3/cm$^2$ | 62.0 | 7656 |

EXAMPLE 2

This example illustrates the use of the inventive process to produce a hot-melt acrylate pressure sensitive adhesive (isooctyl acrylate/acrylic acid monomer ratio: 93/7). Two essentially adiabatic reaction cycles are used without a vacuum strip of residual unreacted monomer.

The following components were charged to the same 75-gallon (284 liter) stainless steel batch reactor used for Example 1: 427.8 lbs. (194.05 kg) of isooctyl acrylate (IOA), 5.0 grams of Vazo™ 52 (2,2'-azobis(2,4-dimethylpentanenitrile)), 80.0 grams of isooctylthioglycoate, 1605.0 grams of a 26 weight % solids mixture of 4-acryloxy benzophenone (ABP) in ethyl acetate, and 32.2 lbs. (14.61 kg) of acrylic acid (AA). The reaction mixture was purged of oxygen and the polymerization reaction was started in a manner similar to that for Example 1. The reaction was started at 150° F. (65.56° C.) and after about 15 minutes of reaction time, with the jacket water temperature tracking the batch temperature in a manner similar to Example 1, the peak batch temperature obtained was 297° F. (147.22° C.).

A sample was taken of the reaction mixture. The polymer IV was 0.62 dl/gm and the unreacted IOA in the mixture was 47 weight % based on total weight of the mixture.

As an in-process correction to adjust the polymer solids down to about 50 weight %, 25.9 pounds of isooctyl acrylate and 1.9 pounds of acrylic acid were added to the batch.

The reaction mixture was cooled similar to Example 1. Once the batch temperature reached about 130° F. (54.44° C.), the following components were charged to the batch: 10.0 grams of Vazo™ 52 (2,2'-azobis(2,4-dimethylpentanenitrile)), 6.0 grams of Vazo™ 88 (2,2'-azobis(cyclohexanecarbonitrile)), and 12.0 grams of di-t-amyl peroxide, 20.0 grams of isooctylthioglycoate, and 10.0 lbs. (4.54 kg) of isooctyl acrylate.

The mixture was agitated at about 100 revolutions per minute while heating to 150° F. (65.56° C.). The batch was purged of oxygen similar to the method used in Example 1 at this stage of the processing. The head space of the reactor was pressured to about 50 psig (448.16 kPa) with nitrogen for the reaction. The reaction procedure was the same as that in Example 1: the reaction was started al 150° F. (65.56° C.) and after 30 minutes of reaction time, with the jacket water temperature tracking the batch temperature in a manner similar to Example 1, the peak batch temperature obtained was approximately 340° F. (171.11° C.). After a two-hour hold while mixing the batch at approximately 340° F. (171.11° C.), 208.7 grams of Irganox™ 1010 (tetrakis(methylene (3,5-di-tert-butyl-4-hydroxyhydrocinnamate))methane), dissolved in 400 grams of ethyl acetate was added to the batch similar to Example 1. A line flush of 200 grams of ethyl acetate was subsequently added to the batch. Next the mixture was stirred at about 80 revolutions per minute for approximately 4 hours at about 340–350° F. (171.11–76.67° C.). No unreacted residual monomer was stripped from the batch, as was the case in Example 1. The product was readily drained from the reactor through an 16-mesh screen with 10 psig (172.37 kPa) nitrogen pressure on the reactor head space.

The resulting product drained had the following properties:

unreacted IOA: 0.4 weight % based on total weight of the mixture
unreacted AA: 0.1 weight % based on total weight of the mixture
IV: 0.69 dl/gm
$M_n$: 10,300
$M_w$: 312,300
$M_w/M_n$: 30

To test the adhesive properties of the polymer product, adhesion and shear tests were conducted with the coated product adhesive (25 micrometer dried coating thickness). The adhesive coating was very smooth, with a glass-like finish, free of any visible polymer gel particles. The adhesive was post cured by exposure to ultraviolet radiation. Two different levels of UV radiation were used to cure the adhesive as shown in Table 3. A control, without any post cure, is also included in the results in Table 3.

TABLE 3

| UV Dose | Adhesion (N/100 mm) | Shear (min) |
| --- | --- | --- |
| 0 (control) | 71.6 | 4.0 |
| 200 mJ/cm$^2$ | 62.0 | 619 |
| 400 mJ/cm$^2$ | 59.8 | 852 |

EXAMPLE 3

This example illustrates the use of the inventive process to produce a hot-melt acrylate pressure sensitive adhesive (isooctyl acrylate/acrylic acid monomer ratio: 90/10). Five essentially adiabatic reaction cycles are used in combination with a vacuum strip of residual unreacted monomer after the reaction cycles are completed.

The following components were charged to the same 75-gallon (284 liter) stainless steel batch reactor used for Example 1: 360.0 lbs. (I 63.29 kg) of isooctyl acrylate (IOA), 4.5 grams of Vazo™ 52 (2,2'-azobis(2,4-dimethylpentanenitrile)), 181.4 grams of carbon tetrabromide, 1047.0 grams of a 26 weight % solids mixture of 4-acryloxy benzophenone (ABP) in ethyl acetate, and 40 lbs. (18.14 kg) of acrylic acid (AA). The reaction mixture was purged of oxygen and the polymerization reaction was started in a manner similar to that for Example 1. The reaction was started at 150° F. (65.56° C.) and after 12 minutes of reaction time, with the jacket water temperature tracking the batch temperature in a manner similar to Example 1, the peak batch temperature obtained was 287° F. (141.67° C).

A sample was taken of the reaction mixture. The polymer IV was 0.54 dl/gm and the unreacted IOA in the mixture was 63 weight % based on total weight of the mixture.

The reaction mixture was cooled similar to Example 1. Once the batch temperature reached about 120° F. (48.89° C.), the following components were charged to the batch: 10.0 grams of Vazo™ 152 (2,2'-azobis(2,4-dimethylpentanenitrile)), 3.0 grams of Vazo™ 88 (2,2'-azobis(cyclohexanecarbonitrile)), and 14.0 grams of di-cumyl peroxide, 10.0 grams of carbon tetrabromide, 40.0 lbs. (18.14 kg) of isooctyl acrylate, 4.4 lbs. (2.00 kg) of acrylic acid, and 116.2 grams of a 26 weight % solids mixture of 4-acryloxy benzophenone (ABP) in ethyl acetate.

The mixture was agitated at about 100 revolutions per minute while heating to 150° F. (65.56° C.). The batch was purged of oxygen by pressuring to about 50 psig (448.16 kPa) and venting to about 2 psig (117.21 kPa) three times. The head space of the reactor was pressured to about 50 psig (448.16 kPa) with nitrogen for the reaction and sealed. The reaction procedure was the same as that in Example 1: the reaction was started at 150° F. (65.56° C.) and after about 35 minutes of reaction time, with the jacket water temperature tracking the batch temperature in a manner similar to Example 1, the peak batch temperature obtained was approximately 323° F. (161.67° C.).

After a 30-minute hold while mixing the batch at approximately 320° F. (160.00° C.), a sample was taken of the reaction mixture. The polymer IV was 0.59 dl/gm and the unreacted IOA in the mixture was 19.5 weight % based on total weight of the mixture.

Fifty minutes after taking the sample above, a mixture of 8.0 grams of di-t-amyl peroxide dissolved in 400.0 grams of ethyl acetate was pressured into the batch followed by a 200.0 gram line flush of ethyl acetate. The batch was de-oxygenated by venting to about 20–30 psig (241.31–310.26 kPa) and pressuring to about 50 psig (448.16 kPa) with nitrogen 2 times. The reactor was pressured to about 50 psig (448.16 kPa) and sealed for continued polymerization. During continued reaction, the batch temperature rose from about 323° F. (161.67° C.) to about 336° F. (168.89° C.).

After an hour, a sample was taken of the reaction mixture. The polymer IV was 0.58 and the unreacted IOA in the mixture was 12.2 weight % based on total weight of the mixture.

Fifty minutes after taking the sample above, a mixture of 10.0 grams of di-t-amyl peroxide dissolved in 400.0 grams of ethyl acetate was pressured into the batch followed by a 200.0 gram ethyl acetate line flush. The batch was de-oxygenated by venting to about 20–30 psig (241.31–310.26 kPa) and pressuring to about 50 psig (448.16 kPa) with nitrogen 2 times. The reactor was pressured to about 50 psig (448.16 kPa) and sealed for continued polymerization. The batch temperature remained at about 335° F. (168.33° C.) during this reaction cycle.

Forty minutes after adding the above 10-gram initiator charge, a mixture of 6.0 grams of di-t-amyl peroxide dissolved in 400.0 grams of ethyl acetate was pressured into the batch followed by a 200.0 gram ethyl acetate line flush. The batch was de-oxygenated by venting to about 20–30 psig (241.31–310.26 kPa) and pressuring to about 50 psig (448.16 kPa) with nitrogen 2 times. The reactor was pressured to about 50 psig (448.16 kPa) and sealed for continued polymerization. The batch temperature remained at about 335° F. (168.33° C.) during this reaction cycle.

After an hour, a sample was taken of the reaction mixture. The unreacted IOA in the mixture was 6.3 weight % based on total weight of the mixture.

After two more hours, 201.6 grams of Irganox™ 1010 (tetrakis(methylene(3,5-di-tert-butyl-4-hydroxyhydrocinnamate))methane), dissolved in 400 grams of ethyl acetate was added to the batch similar to Example 1. A line flush of 200 grams of ethyl acetate was subsequently added to the batch. The batch was mixed at about 320° F. (1 60.00° C.) with about 50–60 revolutions per minute agitation.

After nine hours, a sample was taken of the reaction mixture. The unreacted IOA in the mixture was 4.4 weight % based on total weight of the mixture. The unreacted residual monomer and residual ethyl acetate were next stripped from the reaction mixture under reduced vacuum at 310° F. (154.44° C.). Vapors were condensed in an external heat exchanger.

The resulting product readily drained from the reactor with a slight nitrogen pressure on the head space. The product drained had the following properties:
unreacted IOA: 2.8 weight % based on total weight of the mixture
unreacted AA: 0.3 weight % based on total weight of the mixture
IV: 0.56 dl/gm
$M_n$: 17,900
$M_w$: 284,000
$M_w/M_n$: 16

To test the adhesive properties of the polymer product, adhesion and shear tests were conducted with the coated product adhesive (25 micrometer dried coating thickness). The adhesive coating was very smooth, with a glass-like finish, free of any visible polymer gel particles. The adhesive was post cured by exposure to ultraviolet radiation. Two different levels of UV radiation were used to cure the adhesive as shown in Table 4. A control, without any post cure, is also included in the results in Table 4.

TABLE 4

| UV Dose | Adhesion (N/100 mm) | Shear (min) |
| --- | --- | --- |
| 0 (control) | 59.8 | 12 |
| 160 mJ/cm$^2$ | 57.1 | 515 |
| 320 mJ/cm$^2$ | 63.9 | 7444 |

EXAMPLE 4

This example illustrates the use of the inventive process to produce a hot-melt acrylate pressure sensitive adhesive (isooctyl acrylate/acrylic acid monomer ratio: 90/10). One essentially adiabatic reaction cycle is used to produce a polymer syrup which can be stripped of unreacted monomer to produce a hot-melt acrylate pressure sensitive adhesive.

The following components were charged to the same 75-gallon (284 liter) stainless steel batch reactor used for Example 1: 414.0 lbs. (187.79 kg) of isooctyl acrylate (IOA), 5.0 grams of Vazo™ 52 (2,2'-azobis(2,4-dimethylpentanenitrile)), 135.0 grams of isooctylthioglycoate, 1605.0 grams of a 26 weight % solids mixture of 4-acryloxy benzophenone (ABP) in ethyl acetate, and 46.0 lbs. (20.87 kg) of acrylic acid (AA). The reaction mixture was purged of oxygen and the polymerization reaction was started in a manner similar to that for Example 1. The reaction was started at 150° F. (65.56° C.) and after about 12 minutes of reaction time, with the jacket water temperature tracking the batch temperature in a manner similar to Example 1, the peak batch temperature obtained was 293° F. (145.00° C.).

The resulting polymer product properties were analyzed and found to be:

Polymer solids: 42.9 weight % based on total weight of the mixture (from solids measurement)
Viscosity @ 25° C.: approximately 30,000 centipoise (Brookfield viscosity)
IV: 0.62 dl/gm
$M_n$: 104,000
$M_w$: 375,000
$M_w/M_n$: 3.6

At this point in the processing, the monomer can be stripped from the polymer using techniques and equipment known to those skilled in the art. To test the adhesive properties of the polymer, the 42.9 weight % solids polymer syrup was knife coated to a 23.75 micrometer dried coating thickness using the methods described above. The adhesive coating was very smooth, with a glass-like finish, free of any visible polymer gel particles. The adhesive was post cured by exposure to ultraviolet radiation. Two different levels of UV radiation were used to cure the adhesive for testing the adhesive properties as shown in Table 5. A control, without any post cure, is also included in the results in Table 5.

TABLE 5

| UV Dose | Adhesion (N/100 mm) | Shear (min) |
| --- | --- | --- |
| 0 (control) | 70.3 | 45 |
| 200 mJ/cm$^2$ | 65.0 | 10,000+ |
| 400 mJ/cm$^2$ | 63.3 | 10,000+ |

EXAMPLE 5

A Reactive System Screening Tool (RSST) was used to perform polymerization reactions for this example and several examples below. The RSST is a small calorimeter available from Fauske and Associates, Inc., Burr Ridge Ill., in which samples of about 10.0 ml can be reacted very nearly adiabatically, apart from a small constant heat input which increases the sample temperature in the test cell a minimum of 0.25° C./min. It has been found that in heating non-reactive samples, the RSST temperature controller does a very good job of maintaining the desired heat rates—the heater automatically increases its power to counterbalance heat losses to the surroundings and the desired heat rate is followed closely. However, in the practice of the present invention, when a sample is heated and it begins to react exothermically, the heater does not increase its power exactly to counterbalance the heat losses as the sample temperature increases, particularly for reactions which start fast and gradually slow at elevated temperatures. The heater power slightly lags the heat losses to the surroundings which increase in proportion to the temperature of the material in the test cell. For example, when a polymerization is conducted in the RSST and the heater is set to its minimum heat rate of 0.25° C./min, when the polymerization finishes due to the depletion of initiator, the temperature of the test cell momentary quits increasing, often slightly cooling a few ° C., until the heater power is increased by the RSST temperature control program to eventually continue heating the non-reacting sample at 0.25° C./min. Therefore, to maintain reaction conditions as close to adiabatic as possible, the heater was set in the range of 0.25° C./min to 0.5° C./min at reaction temperatures above 135° C. to increase the heater input power to more accurately offset the heat losses during reaction to facilitate adiabatic polymerization. The higher heat rate is used for faster reactions. This heat program procedure with the RSST has been verified by comparing temperature profiles of RSST polymerizations and 75-gallon polymerizations where the reactor jacket water temperature is set to closely track the batch temperature. The particular version of the RSST used for the examples herein contained a double bottom heater and a stainless steel sheath thermocouple for the temperature measurements.

This example illustrates the use of the inventive process to produce a hot-melt acrylate pressure sensitive adhesive (isooctyl acrylate/methyl acrylate/acrylic acid monomer ratio: 75/20/5). Two essentially adiabatic reaction cycles are used without a vacuum strip of residual unreacted monomer.

The following mixture was charged to the RSST test cell: 5.92 grams of isooctyl acrylate, 0.40 grams of acrylic acid, 1.62 grams of methyl acrylate, 0.010 grams of isooctylthioglycoate, 0.092 grams of a 26 weight % solids mixture of 4-acryloxy benzophenone (ABP) in ethyl acetate, and 0.08 grams of 0.20 grams of VaZoTm 52 (2,2'-azobis (2,4-dimethylpentanenitrile)) dissolved in 100 grams of isooctyl acrylate.

Once the RSST test cell was charged with the reaction mixture, it was sealed in the RSST containment vessel. With agitation from a magnetic stir bar, the reaction mixture was de-oxygenated by pressuring the containment vessel to about 300 psig (2171.84 kPa) with nitrogen, holding for about one minute, venting to about 5 psig (137.89 kPa), and holding for about one minute. Pressuring and venting was repeated a total of five times. Next the RSST containment vessel was pressured to about 100 psig (792.89 kPa) with nitrogen to suppress boiling of the unreacted monomers as the reaction temperature increased.

The RSST heater was programmed to automatically ramp the test cell temperature up from room temperature to 55° C. at 1° C./min and then heat at 0.25° C./min. The polymerization began at about 60° C. (indicated by a gradually increasing rate of temperature rise) and over a period of about 27 minutes, the temperature increased to and peaked at about 160° C. At this point, the RSST heater was turned off and the sample was cooled to about 30° C.

To the reaction product from the first reaction cycle was mixed 1.40 grams of isooctyl acrylate, 0.10 grams of acrylic acid, 0.40 grams of methyl acrylate, 0.023 grams of grams of a 26 weight % solids mixture of 4-acryloxy benzophenone (ABP) in ethyl acetate, and 0.10 grams of the following mixture: 100.0 grams isooctyl acrylate, 0.38 grams Vazo™ 52 (2,2'-azobis(2,4-dimethylpentanenitrile)), 0.28 grams Vazo™ 88 (2,2'-azobis(cyclohexanecarbonitrile)), 0.05 grams di-t-amyl peroxide, 0.15 grams t-amyl hydroperoxide. The test cell was placed in the RSST containment vessel again and de-oxygenated using the same procedure as that for the first reaction cycle and pressured to about 100 psig (792.89 kPa) for reaction.

For this reaction cycle, the RSST was set to automatically ramp the test cell's temperature up to 55° C. at 1° C./min, up to 60° C. at 0.5° C./min, up to 135° C. at 0.25° C./min, up to 180° C./min, and finally up to 185° C. at 0.25° C./min. As the reaction mixture warmed, when it reached about 65° C., polymerization began. After about 90 minutes the reaction temperature peaked at about 165° C. At this point adiabatic reaction conditions were abandoned, and by the pre-programmed temperature profile described above, the sample continued to warm to 185° C. and was held at this temperature for 360 minutes. The properties of the resulting polymer were analyzed and were found to be:

Polymer solids: 96.0 weight % based on total weight of the mixture (from solids measurement)
IV: 0.52 dl/gm
$M_n$: 13,900
$M_w$: 222,200
$M_w/M_n$: 16.0

To test the adhesive properties of the polymer product, adhesion and shear tests were conducted with the coated product adhesive (25 micrometer dried coating thickness). The adhesive coating was very smooth, with a glass-like finish, free of any visible polymer gel particles. The adhesive was post cured by exposure to ultraviolet radiation. Two different levels of UV radiation were used to cure the adhesive as shown in Table 6. A control, without any post cure, is also included in the results in Table 6.

TABLE 6

| UV Dose | Adhesion (N/100 mm) | Shear (min) |
| --- | --- | --- |
| 0 (control) | 79.3 | 1.32 |
| 200 mJ/cm$^2$ | 60.0 | 897 |
| 400 mJ/cm$^2$ | 55.9 | 1261 |

EXAMPLE 6

This example illustrates the use of the inventive process to produce a hot-melt acrylate pressure sensitive adhesive.

The use of a methacrylate-terminated styrene macromonomer as one of the monomers being polymerized is demonstrated, eliminating the need for post curing the adhesive to build up internal strength of the adhesive (isooctyl acrylate/styrene macromonomer/acrylic acid monomer ratio: 87/6/7).

The following mixture was added to the RSST test cell: 8.88 grams of the following mixture: 79.06 grams of isooctyl acrylate, 7.00 grams of acrylic acid, 0.127 grams of isooctylthioglycoate, and 2.50 grams of a solution of 0.05 grams of Vazo™ 52 (2,2'-azobis(2,4-dimethylpentanenitrile)) dissolved in 90.0 grams of isooctyl acrylate. Also 1.14 grams of a 52.5 weight % solution of a methacrylate-terminated styrene macromonomer dissolved in isooctyl acrylate was added to the test cell. The methacrylate-terminated styrene macromonomer had weight average molecular weight of about 10,000, a polydispersity of about 1.0, and was prepared in the manner described in Example M-1 of U.S. Pat. No. 4,732,808.

Once the RSST test cell was charged with the reaction mixture, it was sealed in the RSST containment vessel. With agitation from a magnetic stir bar, the reaction mixture was de-oxygenated by pressuring the containment vessel to about 300 psig (2171.84 kPa) with nitrogen, holding for about one minute, venting to about 5 psig (137.89 kPa), and holding for about one minute. Pressuring and venting was repeated a total of five times. Next the RSST containment vessel was pressured to about 100 psig (792.89 kPa) with nitrogen to suppress boiling of the unreacted monomers as the reaction temperature increased.

The RSST was set to ramp the test cell temperature up from room temperature to 55° C. at 1.0° C./min and then ramp the temperature up 0.25° C./min after passing 55° C. The polymerization began at about 64° C. and over a period of about 23 minutes, the temperature increased to and peaked at about 133° C. The heater of the RSST was then turned off and the sample was cooled to about 30° C.

To the reaction product from the first reaction cycle was mixed 0.10 grams of the following mixture: 100.0 grams isooctyl acrylate, 0.4792 grams Vazo™ 52 (2,2'-azobis(2,4-dimethylpentanenitrile)), 0.2815 grams Vazo™ 88 (2,2'-azobis(cyclohexanecarbonitrile)), and 0.1220 grams di-t-amyl peroxide. The test cell was placed in the RSST containment vessel again and de-oxygenated using the same procedure as that for the first reaction cycle and pressured to about 50 psig (448.16 kPa) for reaction. The RSST was set to automatically ramp the test cell's temperature up to 55° C. at 1° C./min, up to 60.0° C at 0.5° C./min, and up at 0.25° C./min past 60.0° C. As the reaction mixture warmed, when it reached about 65° C., polymerization began. After about 133 minutes the reaction temperature peaked at 160° C.

The polymer product was found to have an IV value of 0.53 dl/gm.

To test the adhesive properties of the polymer product, adhesion and shear tests were conducted with the coated product adhesive (21 micrometer dried coating thickness). The adhesive coating was very smooth, with a glass-like finish, free of any visible polymer gel particles. The adhesive was not post cured by (exposure to ultraviolet radiation. The adhesive properties obtained were adhesion of 60.7 N/100 mm and a shear value of 1577 minutes. Compared to other adhesive samples prepared in the examples presented herein, this shear value is much higher than the other non-ultraviolet radiation cured control samples.

EXAMPLE 7

This example illustrates the application of the inventive process to make a polymer using octadecyl acrylate/isooctyl acrylate/N,N-dimethyl acrylamide with a monomer ratio: 50/14.3/35.7.

The following components were charged to a 10-gallon (37.9 liter) stainless steel batch reactor: 17.7 lbs. (8.03 kg) octadecyl acrylate, 5.1 lbs. (2.31 kg) isooctyl acrylate, 12.7 lbs. (5.76 kg) N,N-dimethyl acrylamide, 0.47 gm Vazo™ 52 (2,2'-azobis(2,4-dimethylpentanenitrile)), and 79.4 grams of 3-mercapto-1,2-propanediol. The reaction mixture was purged of oxygen by bubbling nitrogen through the reaction mixture for 20 minutes with the reactor's 2-blade, anchor-type agitator set at about 75 revolutions per minute. The reactor head space next was pressured to 50 psig (448.16 kPa) with nitrogen and sealed for reaction. The batch was heated to 140° F. (60° C.) and when the reaction began, the temperature of the water in the jacket of the reactor was set to track the temperature of the batch. After 27 minutes of reaction, the batch temperature peaked at 276° F. (135.5° C.). The batch was then cooled to 125° F. (51.7° C.). Next, after venting the nitrogen pressure, the following components were added to the reactor: 1.08 grams of Vazo™ 52 (2,2'-azobis(2,4-dimethylpentanenitrile)), 0.60 grams Vazo™ 88 (2,2'-azobis(cyclohexanecarbonitrile)), 0.51 grams of di-t-amyl peroxide, 100.0 grams of octadecyl acrylate, 28.6 gm isooctyl acrylate, and 71.4 gm N,N-dimethyl acrylamide. Next, to purge oxygen from the reaction mixture, a slight vacuum was pulled on the head space to cause trapped nitrogen to bubble out of the reaction mixture for about 20 seconds. The batch was then pressured to about 2 psig (117.21 kPa). Again a slight vacuum was pulled on the head space to cause trapped nitrogen to bubble out of the reaction mixture for about 20 seconds. Finally, the reactor head space was pressured to about 50 psig (448.16 kPa). Next the reaction mixture was warmed to 150° F. (65.56° C.) and when the reaction began, the temperature of the water in the jacket of the reactor was set to track the temperature of the batch. After 55 minutes of reaction, the batch temperature peaked at 294° F. (145.5° C.). The reaction mixture was held at about 280° F.–290° F. (137.8° C–143.3° C.) for the next four hours. The polymer product, at about 270° F. (132.2° C.) readily drained through a 40-mesh screen with essentially no hang-up in the reactor. The properties of the resulting polymer were analyzed and were found to be:

Polymer solids: 98.9 weight % based on total weight of the mixture (from solids measurement)

$M_n$: 16,300

$M_w$: 43,600

$M_w/M_n$: 2.81

EXAMPLE 8

This example illustrates the application of the inventive process to make a polymer using octadecyl acrylate/ethyl acrylate/methyl methacrylate with a monomer ratio: 30/33.4/36.6.

10.0 grams of the following mixture was charged to an RSST test cell: 30% octadecyl acrylate, 33.4% ethyl acrylate, and 36.6% methyl methacrylate (all based on weight percent). Also charged to the test cell were 0.05 grams of 3-mercapto-1,2-propanediol and 0.10 grams of a mixture of 0.3 grams of Vazo™ 52 (2,2'-azobis(2,4-dimethylpentanenitrile)) and 0.3 grams of Vazo™ 67 (2,2'-azobis(2-methylbutanenitrile)) dissolved in 25.0 grams of methyl methacrylate.

Once the RSST test cell was charged with the reaction mixture, it was sealed in the RSST containment vessel. With agitation from a magnetic stir bar, the reaction mixture was de-oxygenated by pressuring the containment vessel to about 300 psig (2171.84 kpa) with nitrogen, holding for about one minute, venting to about 5 psig (137.89 kPa), and holding for about one minute. Pressuring and venting was repeated a total of five times. Next the RSST containment vessel was pressured to about 50 psig (448.16 kPa) with nitrogen to suppress boiling of the unreacted monomers as the reaction temperature increased.

The RSST was set to ramp test cell temperature up to 55° C. at 1.0° C./min and then ramp the temperature up 0.35° C./min above 55° C. The polymerization began at about 65° C. and over a period of about 49 minutes, the temperature increased to and peaked at about 149° C. The heater of the RSST was turned off and the sample was cooled to about 30° C.

Next, 0.10 grams of the following mixture was mixed into the reaction product from the first reaction cycle: of 0.3 grams of Vazo™ 52 (2,2'-azobis(2,4-dimethylpentanenitrile)), 0.3 grams of Vazo™ 67 (2,2'-azobis(2-methylbutanenitrile)), and 0.3 grams of Vazo™ 88 (2,2'-azobis(cyclohexanecarbonitrile)) dissolved in 25.0 grams of methyl methacrylate. The test cell was place in the RSST containment vessel again and de-oxygenated using the same procedure as that for the first reaction cycle and pressured to about 50 psig (448.16 kPa) for reaction. The RSST was programmed to ramp the test cell's temperature up to 55° C. at 1° C./min and then ramp at 0.35° C./min up to 140° C. As the reaction mixture warmed, when it reached about 74° C., polymerization began. After about 30 minutes the reaction temperature peaked at 140° C. At this point the sample was held at 140° C. for 180 more minutes. The properties of the resulting polymer were analyzed and were found to be:

Polymer solids: 94.5 weight % based on total weight of the mixture (from solids measurement)
$M_n$: 17,946
$M_w$: 43,390
$M_w/M_n$: 2.42

EXAMPLES 9, 10, 11

A series of methyl methacrylate (MMA) polymerizations was performed in the Reactive System Screening Tool (RSST). In each case the test cell was charged with methyl methacrylate, n-octyl mercaptan, Vazo™ 52 (2,2'-azobis(2, 4-dimethylpentanenitrile)), Vazo™ 88 (2,2'-azobis (cyclohexanecarbonitrile)), and di-t-amyl peroxide in the amounts shown in Table 7. The methyl methacrylate was used as supplied from ICI Acrylics, St. Louis, Mo., with 10 ppm MEHQ inhibitor (4-methoxyphenol).

TABLE 7

| Example | MMA | n-octyl mercaptan | Vazo ™ 52 | Vazo ™ 88 | di-t-amyl peroxide |
|---|---|---|---|---|---|
| 9 | 10.0 gm | 0.01 gm | 0.001 gm | 0 gm | 0 gm |
| 10 | 10.0 gm | 0.01 gm | 0.001 gm | 0.001 gm | 0 gm |
| 11 | 10.0 gm | 0.01 gm | 0.001 gm | 0.001 gm | 0.0006 gm |

Once the RSST test cell was charged with the reaction mixture, it was sealed in the RSST containment vessel. With agitation from a magnetic stir bar, the reaction mixture was de-oxygenated by pressuring the containment vessel to about 300 psig (2171.84 kPa) with nitrogen, holding for about one minute, venting to about 5 psig (137.89 kPa), and holding for about one minute. Pressuring and venting was repeated a total of five times. Next the RSST containment vessel was pressured with nitrogen to suppress boiling of the unreacted MMA as the reaction temperature increased. The RSST was pressured to about 50 psig (448.16 kPa) for Examples 9 and 10 and it was pressured to about 100 psig (792.89 kPa) for Example 11.

The RSST was set to ramp test cell temperature up from room temperature to 55° C. at 1.0° C./min and then ramp the temperature up 0.25° C./min above 55° C. The temperature of the reaction mixtures during warming and during polymerization are shown in FIG. 3. In each case, once the rate of temperature rise dropped to about 0.25° C., the heater of the RSST was turned off. In each case, the polymerization reaction began at about 58–60° C. (where the rate of temperature rise increased above 0.25° C./min).

The conversions determined from solids measurements, GPC data, and IV data for each experiment are presented in Table 8. The conversion values shown are weight percent polymer in the final reaction mixture. Because the GPC was calibrated with poly(styrene) standards, the molecular weights shown in Table 8 are not meant to be absolute values.

TABLE 8

| Sample | Conversion | $M_n$ | $M_w$ | p | IV |
|---|---|---|---|---|---|
| Example 9 | 20.4% | 92,500 | 201,000 | 2.18 | 0.31 |
| Example 10 | 48.5% | 82,900 | 175,800 | 2.12 | 0.37 |
| Example 11 | 74.5% | 72,700 | 164,300 | 2.26 | 0.35 |
| Standard | — | 31,700 | 83,600 | 2.64 | — |

As shown in Table 8, the polydispersity values obtained are quite low. In fact they are close to the minimum value of 2.0 obtainable with free-radical polymerization of MMA (Ray, W. H., "On the Mathematical Modeling of Polymerization Reactors," *J. Macromol. Sci. Macromol. Chem.*, C8(1), 1, 1972). A poly(methyl methacrylate) secondary standard was measured for comparison. The secondary standard was from Scientific Polymer Products, Inc. Its $M_w$ indicated on the sample jar was 93,300 and its $M_n$ indicated on the jar was 46,400. The measured polydispersities of the examples were all less than that for the secondary standard which had a polydispersity of 2.01.

MMA isothermal polymerization is known to exhibit an autoacceleration of the polymerization rate with an accompanying increase in molecular weight and a broadening of the molecular weight distribution. This autoacceleration can become pronounced as low as 20 weight % polymer content in the monomer for isothermal polymerization (*Principles of Polymer Chemistry*, P. J. Flory, Cornell University Press, 1953). Because the molecular weight distributions remained at a polydispersity of about 2.0 with increasing conversion, this indicates that the increasing temperature profile made the autoacceleration phenomenon negligible, enabling the attainment of a narrow molecular weight distribution.

Theoretically, temperature-controlled free-radical polymerization, in the absence of significant gel effect, must employ a decreasing temperature profile to minimize the broadening of the molecular weight distribution as polymerization progresses (Sacks et al., "Effect of Temperature Variations Molecular Weight Distributions: Batch, Chain Addition Polymerizations," *Chem. Eng. Sci.*, 28, 241, 1973). A decreasing temperature profile would be counter productive in this case because the viscosity would become increasingly unmanageable as the temperature decreased, particularly in combination with the increasing polymer content from reaction.

While this invention has been described in connection with specific embodiments, it should be understood that it is capable of further modification. The claims herein are intended to cover those variations which one skilled in the art would recognize as the chemical equivalent of what has been described here.

What is claimed is:

1. A method of free radically polymerizing vinyl monomers comprising the steps of:
   (a) providing a non-heterogeneous mixture comprising:
      (i) free radically (co)polymerizable vinyl monomers;
      (ii) optional chain transfer agent;
      (iii) optional crosslinking agent;
      (iv) at least one thermal free-radical initiator;
      (v) optionally polymer comprising polymerized free radically polymerizable monomers;
   in a batch reactor, wherein the mixture comprises less than about 20% by weight dissolved solvent;
   (b) deoxygenating the mixture if the mixture is not already deoxygenated, wherein step (b) can optionally at least partially overlap with step (c);
   (c) heating the mixture to a sufficient temperature to generate sufficient initiator free radicals from at least one thermal free radical initiator so as to initiate polymerization;
   (d) allowing the mixture to polymerize under essentially adiabatic conditions to yield and at least partially polymerized mixture; (e) optionally heating the mixture to generate free radicals from some or all of any initiator that has not generated initiator free radicals, followed by allowing the mixture to polymerize under essentially adiabatic conditions to yield a further polymerized mixture; and
   (f) optionally repeating step (e) one or more times
   (g) optionally cooling the mixture; (h) adding additionally to the mixture in the batch reactor containing the polymer at least one thermal free radical initiator wherein the initiator(s) of step (h) can be the same or different than the initiator(s) of step (a), optionally free radically polymerizable monomers, optionally crosslinking agents, optionally chain transfer agent(s), optionally polymer comprising polymerized free radically polymerizable monomers, wherein the mixture optionally has a temperature below that which would generate initiator free radicals from the initiator(s) added in step (h);
   (i) deoxygenating the mixture if the mixture of step (h) is not already deoxygenated;
   (j) optionally heating the mixture of step (i) to generate initiator free radicals from at least one initiator to further polymerize the mixture if the mixture has a temperature below that which would generate initiator free radicals from the initiator(s) in step (h);
   (k) allowing the mixture of step (j) to further polymerize under essentially adiabatic conditions to yield a further polymerized mixture;
   (l) optionally heating the mixture of step (k) to generate free radicals from some or all of any initiator that has not generated initiator free radicals, followed by allowing the mixture to polymerize under essentially adiabatic conditions to yield a further polymerized mixture;
   (m) optionally repeating step (l) one or more times;
   (n) optionally repeating steps (g) through (m) one or more times.

2. The method of claim 1 wherein the free radically polymerizable monomer is selected from the group consisting of acrylate monomers.

3. The method of claim 1 wherein the free radically polymerizable monomer is selected from the group consisting of monofunctional unsaturated acrylate esters of a non-tertiary alkyl alcohol, wherein the alkyl group contains about 1 to about 18 carbon atoms.

4. The method of claim 1 wherein the initiator(s) are selected from the group consisting of organic peroxides, organic hydroperoxides, azo-group initiators, and mixtures thereof.

5. The method of claim 1 wherein the mixture further comprises about 0 to about 5 percent by weight of a chain transfer agent based upon the total weight of the monomers.

6. The method of claim 5 wherein the chain transfer agent is selected from the group consisting of carbon tetrabromide, hexanebromoethane, bromotrichloromethane, 2-mercaptoethanol, t-dodecylmercaptan, n-octal mercaptan, isooctylthioglycoate, 3-mercapto-1,2-propanediol ,cumene, and mixtures thereof.

7. The method of claim 1 wherein the mixture comprises about 0 to about 10 percent by weight of a non-copolymerizable crosslinking agent based upon the total weight of the mixture.

8. The method of claim 1 wherein the mixture comprises about 0 to about 2 percent by weight of a copolymerizable crosslinking agent based on the total weight of the mixture.

9. The method of claim 1 wherein the mixture comprises about 0 to about 50 percent by weight of the polymer based upon the total weight of the monomer plus the polymer.

10. The method of claim 8 wherein the copolymerizable crosslinking agent is 4-acryloxybenzophenone.

11. The method of claim 1 wherein the initiator(s) are selected from the group consisting of benzoyl peroxide, di-t-amyl peroxide, di-cumyl peroxide, t-amyl hydroperoxide, t-butyl hydroperoxide, 2,2'-azobis(2,4-dimethylpentanenitrile), 2,2'-azobis(2-methylpropanenitrile), 2,2'-azobis(cyclohexanecarbonitrile), 2,2'-azobis(2-methylbutanenitrile), t-butyl peroxy benzoate, and mixtures thereof.

12. The method of claim 1 wherein more than one initiator is present in the mixture of step (a).

13. The method of claim 1 wherein 1 to 5 different initiators are present in the mixture of step (a), 1 to 5 different initiators are present in step (h), and 1 to 5 different initiators are present in each repeat of steps (g) through (m) when step (n) is included.

14. The method of claim 1 wherein 2 to 5 different initiators are present in the mixture of step (a), 2 to 5 different initiators are present in step (h), and 2 to 5 different initiators are present in each repeat of steps (g) through (k) when step (n) is included.

15. The method of claim 1 wherein when more than one initiator is included in the mixture, and the value of $$-\left(\frac{d I_i}{d t}\right),$$

the negative value of the first derivative of the concentration of initiator i with respect to time, for at least one initiator i in a series of n initiators ordered by lowest temperature to highest temperature for each initiator i which produces a one-hour half life, wherein $i \leq n-1$, $n>1$, and $i=1, \ldots, n$, decreases to about 10% of its maximum value, the value of $$-\left(\frac{d I_{i+1}}{d t}\right)$$

for the next initiator in the series has increased to at least about 20% of its maximum value, as the reaction temperature increases due to essentially adiabatic polymerization, wherein n is the number of initiators and t is time.

16. The method of claim 1 wherein when more than one initiator is used, and the value of $$-\left(\frac{dI_i}{dt}\right),$$

the negative value of the first derivative of the concentration of initiator i with respect to time, for at least one initiator i in a series of n initiators where i>1, n>1, and where i=1, ..., n, reaches about 30% of its maximum value, the previous initiator in the series of initiators ordered by lowest temperature to highest temperature for each initiator i which produces a one-hour half life, has already reached its maximum value of $$-\left(\frac{dI_{i-1}}{dt}\right),$$

as the reaction temperature increases due to essentially adiabatic polymerization, wherein n is the number of initiators and t is time.

17. The method of claim 1 wherein total amount of all the initiator(s) used is in the mixture ranges from about 0.0005 weight % to about 0.5 weight % based on the total weight of the monomer(s).

18. The method of claim 1 wherein total amount of all the initiator(s) used is in the mixture ranges from about 0.001 weight % to about 0.1 weight % based on the total weight of the monomer(s).

19. The method of claim 1 wherein the mixture comprises about 1 to about 30 percent by weight of a macromonomer based upon the total weight of the monomer.

20. A method for producing pressure sensitive adhesive comprising the method of claim 1.

21. The method of claim 1 wherein the macromonomer is of a formula X—(Y)$_n$—Z wherein X is a vinyl group copolymerizable with other monomer (s) in the reaction mixture;

Y is a divalent linking group; where n can be zero or one; and

Z is a monovalent polymeric moiety having a glass transition temperature, $T_g$, greater than about 20° C., and a weight average molecular weight in the range of about 2,000 to about 30,000 and being essentially unreactive under copolymerization conditions.

22. The method of claim 1 wherein polymerization is conducted under adiabatic conditions.

23. The method of claim 1 further comprising the step of isolating a polymerized polymer mixture.

24. The method of claim 1 further comprising the step of further polymerizing the partially polymerized mixture.

25. The method of claim 1 wherein the mixture comprises a homogeneous, bulk mixture.

26. The method of claim 1 wherein the free radically polymerizable monomer is selected from the group consisting of isooctyl acrylate, isononyl acrylate, 2-ethylhexyl acrylate, decyl acrylate, dodecyl acrylate, n-butyl acrylate, hexyl acrylate, octadecyl acrylate, methyl acrylate, ethyl acrylate, butyl acrylate, methyl methacrylate, N-butyl methacrylate, N-vinyl pyrrolidone, N,N-dimethyl acrylamide, acrylic acid, and mixtures thereof.

27. The method of claim 1 wherein the free radically polymerizable monomer is selected from the group consisting of monoalkenyl aromatic monomers, vinyl ester monomers, and mixtures thereof.

* * * * *